US008901272B2

(12) United States Patent
Jernigan

(10) Patent No.: US 8,901,272 B2
(45) Date of Patent: *Dec. 2, 2014

(54) POLYESTER POLYMERS WITH LOW ACETALDEHYDE GENERATION RATES AND HIGH VINYL ENDS CONCENTRATION

(75) Inventor: Mary Therese Jernigan, Kingsport, TN (US)

(73) Assignee: Grupo Petrotemex, S.A. de C.V., San Pedro Garza Garcia (MX)

( * ) Notice: Subject to any disclaimer, the term of this patent is extended or adjusted under 35 U.S.C. 154(b) by 1033 days.

This patent is subject to a terminal disclaimer.

(21) Appl. No.: 11/701,794

(22) Filed: Feb. 2, 2007

(65) Prior Publication Data
US 2008/0188602 A1   Aug. 7, 2008

(51) Int. Cl.
C08G 63/00 (2006.01)
C08G 63/83 (2006.01)
C08G 63/85 (2006.01)
C08G 63/84 (2006.01)
C08G 63/78 (2006.01)
C08G 63/02 (2006.01)
C08G 63/183 (2006.01)

(52) U.S. Cl.
CPC ............ C08G 63/83 (2013.01); C08G 63/85 (2013.01); C08G 63/183 (2013.01); C08G 63/84 (2013.01); C08G 63/78 (2013.01)
USPC ............ 528/286; 528/272; 528/279; 528/282

(58) Field of Classification Search
CPC .... C08G 63/78; C08G 63/866; C08G 63/183; C08G 63/83; C08G 63/84; C08G 63/85
USPC ......................................... 528/272, 282, 286
See application file for complete search history.

(56) References Cited

U.S. PATENT DOCUMENTS

| 2,720,506 A | 10/1955 | Caldwell et al. |
| 2,808,390 A | 10/1957 | Caldwell et al. |
| 3,451,971 A | 6/1969 | Lazarus |
| 3,533,973 A | 10/1970 | Stewart et al. |
| 3,538,045 A | 11/1970 | Stewart et al. |
| 3,624,040 A | 11/1971 | Rath et al. |
| 3,631,153 A | 12/1971 | Carter et al. |
| 3,796,691 A | 3/1974 | Chimura et al. |
| 3,867,349 A | 2/1975 | Heeg et al. |
| 3,880,582 A | 4/1975 | Sawaya |
| 4,100,142 A | 7/1978 | Schaefer et al. |
| 4,107,149 A | 8/1978 | Bier et al. |
| 4,124,566 A | 11/1978 | Saiki et al. |
| 4,169,006 A | 9/1979 | Matsubara et al. |
| 4,260,735 A | 4/1981 | Bander et al. |
| 4,289,871 A | 9/1981 | Rowan et al. |
| 4,401,804 A | 8/1983 | Wooten et al. |
| 4,433,135 A | 2/1984 | Worley et al. |
| 4,434,276 A | 2/1984 | Horlbeck et al. |
| 4,440,924 A | 4/1984 | Kuze et al. |
| 4,501,878 A | 2/1985 | Adams |
| 4,613,664 A | 9/1986 | Tate et al. |
| 4,619,987 A | 10/1986 | Saiki et al. |
| 4,647,650 A | 3/1987 | Sasaki et al. |
| 4,686,274 A | 8/1987 | Harris et al. |
| 4,705,844 A | 11/1987 | Espenschied et al. |
| 4,775,598 A | 10/1988 | Jaeckel |
| 4,806,696 A | 2/1989 | Job |
| 4,831,115 A | 5/1989 | Golba, Jr. et al. |
| 4,845,186 A | 7/1989 | Chujo et al. |
| 4,876,230 A | 10/1989 | Job |
| 4,906,693 A | 3/1990 | Craun et al. |
| 5,008,230 A | 4/1991 | Nichols |
| 5,041,405 A | 8/1991 | Lunsford et al. |
| 5,124,301 A | 6/1992 | Wyness et al. |
| 5,254,288 A | 10/1993 | Verheijen et al. |
| 5,296,587 A | 3/1994 | Sumner, Jr. et al. |
| 5,318,797 A | 6/1994 | Matijevic et al. |
| 5,322,883 A | 6/1994 | Adyha et al. |
| 5,331,066 A | 7/1994 | Takanoo et al. |
| 5,376,702 A | 12/1994 | Stibal et al. |
| 5,403,807 A | 4/1995 | Narula |
| 5,496,887 A | 3/1996 | Braune |
| 5,519,112 A | 5/1996 | Harazoe et al. |
| 5,573,820 A | 11/1996 | Harazoe et al. |
| 5,589,530 A | 12/1996 | Walsh |

(Continued)

FOREIGN PATENT DOCUMENTS

| AT | 259232 | 4/1965 |
| CA | 2 622 032 A1 | 3/2007 |

(Continued)

OTHER PUBLICATIONS

International Search Report dated Jun. 27, 2008 for corresponding patent application.
Bashir, Z, et al., "Acetaldehyde Generation in Poly(ethylene Terephthalate) Resins for Water Bottles," 2002, Journal of Macromolecular Science, Part A—Pure and Applied Chemistry, vol. A39, No. 12, pp. 1407-1433.
Billmeyer, Jr., Methods for Estimating Intrinsic Viscosity, Journal of Polymer Science, 1949, pp. 83-86, vol. IV, Arlington, New Jersey.
Office Action issued Aug. 22, 2011 in Chinese Application No. 200880003895.7 (English Translation).
Office Action issued Jan. 19, 2012, in Canadian Patent Application No. 2,675,368.
Chinese Office Action issued Mar. 9, 2012, in Patent Application No. 200880003895.7 (submitting English translation only).
U.S. Appl. No. 13/468,687, filed May 10, 2012, Jernigan.
Ukraine Office Action issued Jul. 3, 2012, in Ukraine Patent Application No. 200909060/(MI-6657) (with English translation).
Office Action issued Jul. 23, 2012 in Chinese Patent Application No. 200880003895.7.
Canadian Office Action Issued Aug. 13, 2012 in Patent Application No. 2,675,368.

(Continued)

Primary Examiner — Ling Choi
Assistant Examiner — Gennadiy Mesh
(74) Attorney, Agent, or Firm — Oblon, Spivak, McClelland, Maier & Neustadt, L.L.P.

(57) ABSTRACT

A polyester polymer comprising alkylene arylate units, said polymer having an It.V. of at least 0.72 dl/g, a vinyl ends concentration of at least 0.8 microequivalents per gram, an AA generation rate of less than 20 ppm are prepared by addition of a catalyst deactivator either late in the polycondensation or upon remelting of a solid polyester polymer.

30 Claims, No Drawings

(56) References Cited

U.S. PATENT DOCUMENTS

| | | |
|---|---|---|
| 5,608,027 A | 3/1997 | Crosby et al. |
| 5,610,231 A | 3/1997 | Braune |
| 5,648,032 A | 7/1997 | Nelson et al. |
| 5,656,716 A | 8/1997 | Schmidt et al. |
| 5,718,860 A | 2/1998 | Lee et al. |
| 5,830,981 A | 11/1998 | Koreishi et al. |
| 5,837,786 A | 11/1998 | Miyoshi et al. |
| 5,852,164 A | 12/1998 | Akai et al. |
| 5,874,515 A | 2/1999 | Huang et al. |
| 5,886,133 A | 3/1999 | Hilbert et al. |
| 5,898,058 A | 4/1999 | Nichols et al. |
| 5,945,460 A | 8/1999 | Ekart et al. |
| 5,962,608 A | 10/1999 | Ryang et al. |
| 6,020,421 A | 2/2000 | Fukushima et al. |
| 6,034,202 A | 3/2000 | Aharoni et al. |
| 6,036,905 A | 3/2000 | Park et al. |
| 6,042,773 A | 3/2000 | Teramoto et al. |
| 6,063,827 A | 5/2000 | Sacripante et al. |
| 6,099,778 A | 8/2000 | Nelson et al. |
| 6,316,584 B1 | 11/2001 | Seidel et al. |
| 6,346,070 B1 | 2/2002 | Ohmatsuza et al. |
| 6,365,659 B1 | 4/2002 | Aoyama et al. |
| 6,384,180 B1 | 5/2002 | Jernigan et al. |
| 6,417,320 B1 | 7/2002 | Otto et al. |
| 6,441,129 B2 | 8/2002 | Duh et al. |
| 6,472,500 B2 | 10/2002 | Dhawan et al. |
| 6,489,434 B2 | 12/2002 | Jen |
| 6,500,915 B1 | 12/2002 | Fujimori et al. |
| 6,503,586 B1 | 1/2003 | Wu et al. |
| 6,541,598 B2 | 4/2003 | Duan et al. |
| 6,559,271 B2 * | 5/2003 | Schaaf et al. ............... 528/272 |
| 6,569,479 B2 | 5/2003 | Rule |
| 6,590,069 B2 | 7/2003 | Nichols et al. |
| 6,601,987 B2 | 8/2003 | Finder et al. |
| 6,638,456 B2 | 10/2003 | Klein et al. |
| 6,649,731 B2 | 11/2003 | Hori et al. |
| 6,664,413 B1 | 12/2003 | Cockrem |
| 6,733,873 B2 | 5/2004 | Mizutani et al. |
| 6,774,204 B1 | 8/2004 | Putzig |
| 6,787,630 B1 | 9/2004 | Dominguez De Walter et al. |
| 6,852,388 B2 | 2/2005 | Murschall et al. |
| 6,887,947 B1 | 5/2005 | Schaefer et al. |
| 6,896,966 B2 | 5/2005 | Crawford et al. |
| 7,129,317 B2 | 10/2006 | Moore et al. |
| 7,138,478 B2 | 11/2006 | Kohlgrueber et al. |
| 7,300,967 B2 | 11/2007 | Xia |
| 2002/0077443 A1 | 6/2002 | Nichols et al. |
| 2002/0087027 A1 | 7/2002 | Lindall et al. |
| 2002/0091226 A1 | 7/2002 | Nichols et al. |
| 2003/0045673 A1 | 3/2003 | Nakajima et al. |
| 2003/0144459 A1 | 7/2003 | Fujimori et al. |
| 2004/0077486 A1 | 4/2004 | Bellamy et al. |
| 2004/0086733 A1 | 5/2004 | Fujimori et al. |
| 2004/0127653 A1 | 7/2004 | Ellington et al. |
| 2004/0138057 A1 | 7/2004 | Wenzel |
| 2004/0225103 A1 | 11/2004 | Kohlgrueber et al. |
| 2004/0241468 A1 | 12/2004 | Otaki |
| 2005/0153086 A1 | 7/2005 | Moore et al. |
| 2005/0203267 A1 | 9/2005 | Jernigan et al. |
| 2006/0047103 A1 | 3/2006 | Armentrout et al. |
| 2006/0223958 A1 | 10/2006 | Fischbuch |
| 2006/0287472 A1 | 12/2006 | Jernigan |
| 2007/0066735 A1 | 3/2007 | Quillen et al. |
| 2007/0066791 A1 * | 3/2007 | Jernigan et al. ............... 528/272 |
| 2007/0106055 A1 | 5/2007 | Kageyama et al. |
| 2007/0203279 A1 | 8/2007 | Jarvis et al. |

FOREIGN PATENT DOCUMENTS

| | | |
|---|---|---|
| DE | 1950553 | 5/1970 |
| EP | 0578464 | 1/1994 |
| EP | 1065230 | 1/2001 |
| EP | 1516892 | 3/2005 |
| GB | 1337751 | 11/1973 |
| JP | 46040711 | 12/1971 |
| JP | 46040713 | 12/1971 |
| JP | 46040714 | 12/1971 |
| JP | 46041025 | 12/1971 |
| JP | 46041031 | 12/1971 |
| JP | 47039497 | 8/1973 |
| JP | 48056782 | 8/1973 |
| JP | 48056783 | 8/1973 |
| JP | 48056784 | 8/1973 |
| JP | 47042989 | 9/1973 |
| JP | 48-79896 | 10/1973 |
| JP | 48079898 | 10/1973 |
| JP | 73035948 | 10/1973 |
| JP | 48044959 | 12/1973 |
| JP | 48099133 | 12/1973 |
| JP | 48102191 | 12/1973 |
| JP | 49045014 | 4/1974 |
| JP | 49045015 | 4/1974 |
| JP | 50039711 | 4/1975 |
| JP | 51042795 | 4/1976 |
| JP | 51127195 | 11/1976 |
| JP | 51145594 | 12/1976 |
| JP | 52123489 | 10/1977 |
| JP | 52129798 | 10/1977 |
| JP | 52129799 | 10/1977 |
| JP | 53051294 | 5/1978 |
| JP | 53051295 | 5/1978 |
| JP | 53052595 | 5/1978 |
| JP | 53105591 | 9/1978 |
| JP | 54135896 | 10/1979 |
| JP | 54163996 | 12/1979 |
| JP | 55089332 | 7/1980 |
| JP | 55115425 | 9/1980 |
| JP | 55149320 | 11/1980 |
| JP | 56008431 | 1/1981 |
| JP | 58109532 | 6/1983 |
| JP | 60219226 | 6/1983 |
| JP | 60-31526 | 2/1985 |
| JP | 60139750 | 7/1985 |
| JP | 60202148 | 10/1985 |
| JP | 62161827 | 7/1987 |
| JP | 621527145 | 7/1987 |
| JP | 62207337 | 9/1987 |
| JP | 62297318 | 12/1987 |
| JP | 63-264661 | 11/1988 |
| JP | 3146707 | 6/1991 |
| JP | 3161509 | 7/1991 |
| JP | 3292323 | 12/1991 |
| JP | 4370142 | 12/1992 |
| JP | 5097990 | 4/1993 |
| JP | 5-117379 | 5/1993 |
| JP | 05097990 | 11/1993 |
| JP | 6087953 | 3/1994 |
| JP | 6-271949 | 9/1994 |
| JP | 1994271494 | 9/1994 |
| JP | 6286088 | 10/1994 |
| JP | 1994306154 | 11/1994 |
| JP | 7133412 | 5/1995 |
| JP | 7224218 | 8/1995 |
| JP | 7-268188 | 10/1995 |
| JP | 1995268188 | 10/1995 |
| JP | 1996003301 | 1/1996 |
| JP | 1996283398 | 10/1996 |
| JP | 8325364 | 12/1996 |
| JP | 1997040850 | 2/1997 |
| JP | 9176464 | 7/1997 |
| JP | 9176465 | 7/1997 |
| JP | 9183892 | 7/1997 |
| JP | 9272793 | 10/1997 |
| JP | 10316765 | 12/1998 |
| JP | 11005892 | 1/1999 |
| JP | 1999152324 | 6/1999 |
| JP | 2000128970 | 5/2000 |
| JP | 2000128971 | 5/2000 |
| JP | 2000129102 | 5/2000 |
| JP | 2000226446 | 8/2000 |
| JP | 200126639 | 1/2001 |
| JP | 2001163964 | 6/2001 |
| JP | 2002249648 | 9/2002 |

(56) References Cited

FOREIGN PATENT DOCUMENTS

| | | |
|---|---|---|
| JP | 2002249653 | 9/2002 |
| JP | 2002322254 | 11/2002 |
| JP | 2002322258 | 11/2002 |
| JP | 2002332337 | 11/2002 |
| JP | 2003171454 | 6/2003 |
| JP | 2003-268628 | 9/2003 |
| JP | 2003301090 | 10/2003 |
| JP | 2003301093 | 10/2003 |
| JP | 2003306536 | 10/2003 |
| JP | 2003306541 | 10/2003 |
| JP | 2004149790 | 5/2004 |
| JP | 2005-272493 A | 10/2005 |
| JP | 2009-508990 A | 3/2009 |
| KR | 9303713 | 5/1993 |
| KR | 120831 | 7/1995 |
| KR | 9707952 | 5/1997 |
| KR | 2001089942 | 10/2001 |
| SU | 374343 | 7/1973 |
| WO | WO 96/03163 | 2/1996 |
| WO | 9744376 | 11/1997 |
| WO | WO 98/41559 | 9/1998 |
| WO | WO 01/14452 | 3/2001 |
| WO | 2004078838 A1 | 9/2004 |
| WO | 2005061581 A1 | 7/2005 |
| WO | WO 03/010226 | 2/2006 |
| WO | 2006138406 A2 | 12/2006 |
| WO | WO 2006/138406 A3 | 12/2006 |
| WO | 2007035256 A2 | 3/2007 |
| WO | 2008/097417 | 8/2008 |

OTHER PUBLICATIONS

Japanese Office Action Issued Oct. 23, 2012 in Patent Application No. 2009-548262 (with English translation).
Office Action issued Sep. 26, 2011 in Ukraine Application No. 200909060 (With English Translation).
Fourth Office Action issued Dec. 28, 2012 in Chinese Patent Application No. 200880003895.7 (with English translation).
Canadian Office Action issued Nov. 22, 2013 in connection with corresponding Canadian Patent Application No. 2,675,368, filed Jan. 16, 2008.
Malaysian Substantive Examination Adverse Report issued Dec. 31, 2013 in connection with corresponding Malaysian Application No. PI 20093177, filed Jan. 16, 2008.
Japanese Office Action issued in connection with corresponding Japanese Patent Application No. 2009-548262, filed Jan. 16, 2008.
English translation of The Notice of Preliminary Rejection issued Apr. 17, 2014 in connection with corresponding Korean Patent Application No. 2009-7015980, filed Jan. 16, 2008.
Co-pending U.S. Appl. No. 11/229,367, filed Sep. 16, 2005.
Co-pending U.S. Appl. No. 11/154,208, filed Jun. 16, 2005.
Co-pending U.S. Appl. No. 11/229,238, filed Sep. 16, 2005.
U.S. Appl. No. 60/718,286, filed Sep. 16, 2005, now expired.
Co-pending U.S. Appl. No. 11/495,431, filed Jul. 28, 2006.
U.S. Appl. No. 60/717,985, filed Sep. 16, 2005, now expired.
Co-pending U.S. Appl. No. 11/500,862, filed Aug. 8, 2006.
Terekhova, Mikhailov, Tokareva; Heat Stability of Polyethylene Terephthalate (PET) Containing Phosphoric Acid Esters; Khimicheskie volokna; 1964; pp. 1-6; No. 4.
Kamatani, Konagaya, Nakamura; Effect of Phosphoric Acid on the Polycondensation of Bis(2-hydroxyethyl) Terephthalate Catalyzed by Sb(III) Compounds; Polymer Journal; 1980; pp. 125-130; vol. 12; No. 2.
Hans Meerwein and Theodor Bersin, Investigations of Metal Alcoholates and Ortho Acid Esters, Annalen der Chemie, Chemical Insitute of Marburg University, 1929, pp. 113-150, vol. 454765.
Hans Meerwein, Increase in Ionization Capacity of Weak Electrolytes as a Result of Complex Formation and its Significance for Catalytic Processes, Annalen der Chemie, Chemical Insitute of Konigsberg University, 1927, pp. 222-253, vol. 455.
Taiwanese Office issued Apr. 8, 2014 in connection with corresponding Taiwanese Patent Application No. 097101677, filed Jan. 15, 2008.
Mexican Office Action issued May 26, 2014 in connection with corresponding Mexican Application No. MX/a/2009/008188, filed Jan. 16, 2008.
American Elements (www.americanelements.com, 2001).
Shaviv, Materials Science and Engineering A, vol. 2009, Issues 1-2, pp. 345-352, 1996.
Toth, Transition Metal Carbides and Nitrides, General Properties, Preparation and Characterization, 1971, pp. 1-28, Academic Press, Inc., New York.
Search Report issued Jul. 5, 2013 in Argentinian Patent Application No. 20080100188 (with partial English language translation).
Office Action issued Apr. 12, 2013 in Canadian Patent Application No. 2,675,368.

* cited by examiner

POLYESTER POLYMERS WITH LOW ACETALDEHYDE GENERATION RATES AND HIGH VINYL ENDS CONCENTRATION

1. FIELD OF THE INVENTION

The present invention relates to a polyester polymer, a process for producing a polyester polymer, a solid polyester polymer particle, and a molded product thereof. More particularly, the present invention relates to a polyester polymer comprising alkylene arylate units and said polymer having an It.V. of at least 0.72 dl/g, a vinyl ends group ("VEG") concentration of at least 0.8 microequivalents per gram, an acetaldehyde generation rate of less than 20 ppm, and a process for producing such a polyester polymer, a solid particle of such polyester polymer, and a molded product made from such a polyester polymer.

2. BACKGROUND OF THE INVENTION

Polyester polymers and especially polyethylene terephthalate polymer are widely used for various applications, such as sheets, boards, extrusion blow molded bottles, extruded laminates, containers, and beverage bottles. The physical characteristics that make polyester polymers and polyester polymer particles such as polyethylene terephthalate (PET) desirable for packaging applications include impact strength, moldability, clarity, transparency, and low color. However, depending upon the specific application, there are other characteristics and properties that are desirable especially for stretch blow molded articles such as CSD and water bottles.

For example, one normally desirable feature of polyester polymer melts and solid particles (e.g. pellets) derived thereof is relatively high molecular weight, generally expressed as inherent viscosity ("IhV) or intrinsic viscosity ("It.V."). To achieve high values of It.V., one known technique is to employ solids polymerization (i.e. "solid stating"). In general, solid stating is a process by which the average molecular weight of polyester polymer solids is increased. A certain minimum level of crystallization is a prerequisite for solid-stating because otherwise the solid particles would stick to each other at solid-stating temperatures. During solid-stating, crystallization continues both in terms of increasing percentage/crystallinity and increasing the perfection of the crystals, which manifests itself as increasing melting point. For example, partially crystallized PET pellets may be subjected to temperatures near but below the crystalline melt temperature for up to 12 hours in a fluidized bed allowing the PET pellets to increase their It.V. while the PET crystallinity increases as well. An inert gas flow or vacuum may be used to remove compounds that are volatile at solid-stating temperatures including acetaldehyde present in the solid polyester particles. Although desirable to eliminate solid stating, the absence of solid stating makes removal of acetaldehyde problematic. The situation is further complicated by the presence of acetaldehyde precursors which may later generate acetaldehyde when the polyester particles are melted (e.g. during injection molding of PET bottle performs). During solid-stating, there is some reaction of AA precursors, such as VEG with hydroxyethyl end groups (HEG) or water, to liberate AA, which may be partially swept away by the inert gas or vacuum. Without solid stating, acetaldehyde precursors may remain at the concentration present after melt-phase polycondensation. In addition, when solid-stating is planned, AA precursors are often present in lower amounts due to the shorter residence time in the melt phase.

Another normally desirable feature is a low concentration of acetaldehyde ("M"). Acetaldehyde has a noticeable taste and can be highly undesirable in beverage container applications. Two categories of AA are of known concern. The first is residual or free AA contained in polyester pellets or polyester particles used as raw material in injection molding or extrusion blow molding. A second type of AA is preform AA or the AA generated when PET pellets are melt processed to make bottle preforms. AA precursors in the solid polyester particles, chemical compounds or chemical functional groups which may react upon melting of the polyester, can produce unacceptable levels of AA in the preforms. In addition, new AA precursors are formed when the polyester polymer is held in the molten state, as in the case of an injection molding process to make bottle preforms. When performs are blown into bottles, unacceptably high AA levels are those that adversely impact the taste of the beverage contained in these bottles. Relatively tasteless beverages such as water are particularly negatively impacted by the taste of AA. Many water bottle applications require lower levels of preform AA than carbonated soft drink ("CSD") bottle applications. Converters who take polyester particles and make bottle preforms would like to have one resin that could be used to make preforms for both water and CSD applications. This would simplify the materials handling at the converter by allowing for one feed silo or one type of feed silo, one product storage area or one type of product storage area etc. . . . Most resins sold into water bottle markets have a lower It.V. than those resins sold into CSD markets. A dual use resin would have to a high enough It.V. for CSD applications and a low enough AA generation rate upon melting for water bottle applications.

There are a number of methods by which to address the problem of high residual AA levels in the solid polyester particles and/or high AA generation rates upon melting. For example, co-pending application Ser. No. 11/229,367, filed Sep. 16, 2005, discloses a process for producing polyester polymer, more specifically a process for producing PET polymers, wherein addition of various types of amine salts of phosphorus-containing acids to molten titanium-catalyzed polyester with a relatively high It.V can produce polyester polymers with low residual AA and low AA generation rates. Alternatively or in addition to other methods, converters may add AA scavengers to CSD resins to get acceptable perform AA for the water market. AA scavengers add significant cost to the container and often negatively impact the color of the container by making it either more yellow or darker as compared to an analogous container without AA scavenger added. When certain AA scavengers are used, the level of black specks present in the solid polyester particles and/or in the molded part can also increase, which results in an undesirable increase in the number of black specks in subsequent molded products.

Another example of a normally desirable characteristic of the polyester polymer melts and any subsequent polyester particles produced by solidification of the melt is that of low vinyl ends concentration. Vinyl ends as represented by the formula: $-CO_2-CH=CH_2$ are known AA precursors. One commonly accepted mechanism by which AA is generated in molten polyester is the internal chain scission of a polyester polymer chain to form a vinyl end group and a carboxylic acid end group. The VEG can react with a HEG to form residual or free AA and a new internal ester linkage. There is a common perception that a high concentration of vinyl ends is thus undesirable due to the ability of the vinyl end to react to form AA during subsequent melt processing of the polyester polymer.

Further, U.S. Pat. No. 5,852,164 indicates that the concentration of olefin terminals or end groups, which is the sum of the vinyl ends, the vinylidene ends, and the methyl cyclohexene ends, is preferred to be less than 25 eq/ton in order to improve the melt heat stability of highly modified polyester polymers, which contain in almost all of the examples about 33 mole percent of 1,4-cyclohexanedimethanol, based on a total diol content of 100 mole percent. In general, it is undesirable, especially in molding processes, for the intrinsic viscosity of the polymer to decrease significantly upon melting as the properties of the resulting article or part will be negatively impacted. Additionally, it is known that vinyl ends may also polymerize under extreme conditions to polyvinyl esters which may eliminate to form poly(enes) that may be responsible for yellow coloration of PET.

Because vinyl ends are known AA precursors, there is a general tendency to operate melt phase polyester polymerization processes at temperatures and production rates to inhibit subsequent generation of AA in downstream melt processing applications. This is especially true when a precursor It.V. is made in the melt phase, followed by solid-stating to obtain a product It.V., which is acceptable for a given application.

What is not generally appreciated is that what is important for AA generation upon melting is not the fact that the VEG concentration is relatively high but why or how the VEG concentration was increased. If the VEG level is relatively high due to an increased finisher temperature with all other things being equal, then the level of AA generated upon melting a polyester will increase. If the VEG level is relatively high due to a decreased reaction rate for the conversion of VEG to AA with all other things being equal, then fewer VEG will be converted to AA with the result that the level of VEG will increase and the level of AA generated upon melting the polyester will decrease.

It is easier to influence the VEG to AA reaction rate, which occurs during melt processing, when the polyester is manufactured exclusively in the melt phase. This is because efforts to slow down the VEG to AA reaction rate after the melt phase manufacturing of polyester precursor usually also have a negative impact on the polycondensation rate during solid stating. On the other hand, it is possible to use a conventional process, including solid stating, and impact the VEG to AA reaction rate at the start of the injection molding process or in a prior extrusion step, such as compounding. This approach would usually be more costly and/or problematic than action taken at the end of a melt-phase line used to make a product or final It.V.

A polyester polymer with the properties of a relatively high vinyl ends concentration from higher temperatures and low AA generation rates is attractive from an economic perspective. For example, it would desirable to operate a PET production process at higher temperatures and higher throughput rates thereby allowing high vinyl ends concentrations to rise to higher concentrations than other known PET polymers while maintaining comparable AA generation rates in subsequent processing applications, such as blow molding of bottles. Efforts to slow down the VEG to AA reaction rate, which increases the level of VEG, will allow higher temperatures to be used in the melt phase manufacturing, which also increases the VEG level, and still obtain lower levels of AA generated during molding as compared to the analogous case at higher temperature but without the VEG to AA reaction rate slowing efforts. Slowing down the VEG to AA reaction rate where the manufacturing temperature is hotter may result in more AA generated or a higher preform AA than in an analogous case with a cooler finisher temperature. It should be noted that to obtain very low preform AA values, it may be necessary to use low to moderate manufacturing temperatures and low to moderate catalyst concentrations in conjunction with slowing down the VEG to AA reaction rate.

Hence, there is a need for a polyester polymer with a high It.V. produced entirely in the melt phase that avoids the costly step of solid stating. Further, the polyester polymer could be treated near the end of the entirely melt-phase manufacturing process so that the VEG to AA reaction rate slows down; therefore, the level of VEG in the solid polyester polymer particles increases while the level of AA generated during melt processing or the preform AA decreases, relative to the case with no treatment. In one embodiment, the polyester polymer could be produced at higher temperatures and higher throughputs thereby resulting in relatively high vinyl ends concentrations and then be treated near the end of the entirely melt-phase manufacturing process so that the VEG to AA reaction rate slows down thereby resulting in relatively high vinyl ends concentrations, yet still generate low amounts of AA upon remelting in the absence of AA scavengers, relative to the case with no treatment. In another embodiment, the need is especially great in resins for water bottle applications which normally demand low levels of M in preforms and bottles, and in these cases, the manufacturing temperatures would be low to moderate, in conjunction with the treatment to lower the VEG to AA rate. It would be even more desirable if the same polyester can be utilized as raw material for both carbonated soft drink and water bottle applications.

3. SUMMARY OF THE INVENTION

In one aspect of the invention, there is provided a process for the manufacture of a polyester polymer, comprising:
  a) polycondensing a polyester polymer in the presence of one or more polycondensation catalysts;
  b) adding at least one additive compound comprising a catalyst deactivator compound to said polyester polymer after said polyester polymer has reached an It.V. of at least 0.45 dl/g; and
  c) further increasing the It.V of said polyester polymer to an It.V of at least 0.72 dl/g thereby producing a polyester polymer with a vinyl ends concentration of at least 0.8 µeq/gram, and an AA generation rate of less than 22 ppm.

In another aspect of the invention, there is provided a polyester polymer composition comprising polyester polymers comprising alkylene arylate units, said polymer having an It.V. of at least 0.72 dl/g, a vinyl ends concentration of at least 0.8 µeq/g, and an AA generation rate of less than 22 ppm, or less than 20 ppm In another aspect of the invention, there is provided a polyester polymer composition comprising polyester polymers comprising alkylene arylate units, said polymer having an It.V. of at least 0.72 dl/g, a vinyl ends concentration of at least 0.8 µeq/g, and a preform AA of less than 10 ppm, preferably in a 20 oz. preform, when measured under the following conditions: an extruder barrel temperature of 285° C. and a melt residence time of about 2 minutes.

In another aspect of the invention, there is provided finished polyester polymer particles comprising polyester polymers comprising alkene aryl units and phosphorus in the amount of at least 20 ppm based on the weight of said polymer having an It.V. of at least 0.7 dl/g, a vinyl ends concentration of at least 0.8 µeq/g, an AA generation rate of less than 22 ppm, and a crystallinity of at least 10%, wherein the weight of the individual particles is in the range of 0.01 to 10 grams.

In another aspect of the invention, there is provided a molded product obtained by directly or indirectly feeding finished polyester polymer particles comprising polyester polymers comprising alkene aryl units and phosphorus in the amount of at least 20 ppm based on the weight of polymer, said polymer having an It.V. of at least 0.7 dl/g, a vinyl ends concentration of at least 0.8 μeq/g, an AA generation rate of less than 22 ppm at a temperature of 295 degrees Celsius for 5 minutes, and a crystallinity of at least 10%, wherein the weight of the individual particles is in the range of 0.01 to 10 grams, to a melt processing zone, melting the particles to form a polyester melt, and forming a molded product from the polyester melt.

4. DETAILED DESCRIPTION OF THE INVENTION

The present invention may be understood more readily by reference to the following detailed description of the invention.

It must also be noted that, as used in the specification and the appended claims, the singular forms "a," "an" and "the" include plural referents unless the context clearly dictates otherwise. For example, reference to processing or making a "polymer," a "preform," an "article," a "container," or a "bottle" is intended to include the processing or making of a plurality of polymers, preforms, articles, containers or bottles.

References to a composition containing "an" ingredient or "a" polymer is intended to include other ingredients or other polymers, respectively, in addition to the one named.

Expressing a range includes all integers and fractions thereof within the range. Expressing a temperature or a temperature range in a process, or of a reaction mixture, or of a melt or applied to a melt, or of a polymer or applied to a polymer means in all cases that the limitation is satisfied if either the applied temperature, the actual temperature of the melt or polymer, or both are at the specified temperature or within the specified range.

The word "composition" means that each listed ingredient is present in the composition, and does not imply that any ingredient in the composition is unbound or unreacted. The composition may be solid or molten. The stated ingredients in the composition may be bound, unbound, reacted, unreacted, and unless otherwise specified, in any oxidation state. The It.V. values described throughout this description are set forth in dL/g units as calculated from the inherent viscosity measured at 25° C. in 60% phenol and 40% 1,1,2,2-tetrachloroethane by weight. Polymer samples are dissolved in the solvent at a concentration of 0.25 g/50 mL. For samples in the Examples section, the viscosity of the polymer solutions is determined using a Rheotek Glass Capillary viscometer. A description of the operating principle of this viscometer can be found in ASTM D 4603. The inherent viscosity is calculated from the measured solution viscosity. The following equations describe such solution viscosity measurements and subsequent calculations to Ih.V. and from Ih.V. to It.V:

$$\eta_{inh}=[\ln(t_s/t_o)]/C$$

where
  $\eta_{inh}$=Inherent viscosity at 25° C. at a polymer concentration of 0.5 g/100 mL of 60% phenol and 40% 1,1,2,2-tetrachloroethane by weight
  ln=Natural logarithm
  $t_s$=Sample flow time through a capillary tube
  $t_o$=Solvent-blank flow time through a capillary tube
  C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0}(\eta_{sp}/C) = \lim_{C \to 0}(\ln \eta_r)/C$$

where
  $\eta_{int}$=Intrinsic viscosity
  $\eta_r$=Relative viscosity=$t_s/t_o$
  $\eta_{sp}$=Specific viscosity=$\eta_r-1$ Instrument calibration involves triplicate testing of a standard reference material and then applying appropriate mathematical equations to produce the "accepted" Ih.V. values. The three values used for calibration shall be within a range of 0.010; if not, correct problems and repeat testing of standard until three consecutive results within this range are obtained.

Calibration Factor=Accepted Ih.V. of Reference Material/Average of Triplicate Determinations The intrinsic viscosity (It.V. or $\eta_{int}$) may be estimated using the Billmeyer equation as follows:

$$\eta_{int}=0.5[e^{0.5 \times Corrected\ Ih.V.}-1]+(0.75 \times Corrected\ Ih.V.)$$

The reference for estimating intrinsic viscosity (Billmeyer relationship) is J. *Polymer Sci.*, 4, pp. 83-86 (1949).

Alternatively, the viscosity of the polymer solutions is determined using a Viscotek Modified Differential Viscometer. A description of the operating principle of the differential pressure viscometers can be found in ASTM D 5225. The uncorrected inherent viscosity ($\eta_{inh}$) of each sample is calculated from the Viscotek Model Y501 Relative Viscometer using the following equation:

$$\eta_{inh}=[\ln(P_2/KP_1)]/C$$

where
  $P_2$=The pressure in capillary $P_2$
  $P_1$=The pressure in capillary $P_1$
  ln=Natural logarithm
  K=Viscosity constant obtained from baseline reading
  C=Concentration of polymer in grams per 100 mL of solvent The corrected Ih.V., based on calibration with standard reference materials, is calculated as follows:

Corrected Iv.V.=Calculated Ih.V.×Calibration Factor

PET samples containing antimony and/or phosphorus were tested for metals by X-ray fluorescence spectroscopy (XRF), as were samples containing titanium and/or phosphorus. PET samples containing aluminum, lithium and/or phosphorus were tested for metals by inductively coupled plasma optical emission spectroscopy (ICP-OES). For the samples in the Examples Section, a wet ash method for ICP-OES involved digestion of PET in sulfuric and nitric acid on a hot plate prior to analysis of an aqueous sample. There is more background contamination possible in the ICP measurements for aluminum in PET for than for lithium in PET. For Example 2, Al and Li levels are measured in duplicate in quartz glassware to minimize background Al contamination. A single test in standard glassware is reported for the other examples. A procedure follows.

Sample Preparation:
  Weigh approx. 1.0 g of polymer into a 100 mL quartz beaker. Add 5 mL concentrated $H_2SO_4$. Cover with a watch glass. Prepare a method blank in the same manner except exclude sample. Place beakers on hot plate and heat on low setting (~100° C.) until charring begins. At this point begin to add conc. $HNO_3$ drop-wise, gradually increasing heat, until solution becomes clear. Reflux for approximately 30 min. on highest heat setting (approx. 400° C.). Cool to room temperature. Quantitatively transfer contents of beaker into a 100 mL volumetric flask. Add Sc internal standard at the 1 ppm level and dilute to the mark with 18 Mohm water.

Analysis using inductively coupled plasma—optical emission spectroscopy (ICP-OES):
Instrument Configuration:
 Spray Chamber: Quartz Glass Cyclonic—unbaffled
 Nebulizer: Quartz Glass Concentric
 Injector: 2 mm ID Quartz
 Plasma Power: 1450 Watts
 Plasma Ar Flow: 18 L/min
 Aux Flow: 0.2 L/min
 Neb Flow: 0.65 L/min
 Sample Uptake: 1.56 mL/min
Method Parameters:
 Analytical Lines:
  Al—396.153 nm Axial plasma view
  Li—670.784 nm Radial plasma view
 Internal Standard Line:
  Sc—361.383 nm Axial plasma view
Calibrate the instrument—2 point calibration using a calibration blank and NIST traceable standards prepared at the 1 ppm level.

Aspirate the samples and analyze using 3 replicates. Report the average of the 3 replicates.

The vinyl ends concentration values described throughout this description are set forth in microequivalents per gram (μeq/g) or millimoles per kilogram (mmoles/kg). The vinyl ends concentration can be measured on solid particles or performs. Vinyl ends are represented by the formula: —$CO_2$—CH=$CH_2$.

A small amount of the polyester sample, typically 0.4 grams, is weighed to the nearest mg and placed in a 4 dram screw top vial along with a Teflon coated stir bar. A fresh solvent mixture (solution A) is prepared with volume ratios by measuring 75 parts chloroform-d (from Aldrich Chemical Company), 19 parts trifluoroacetic acid, and 6 parts trifluoroacetic anhydride. 4.00 ml of the solution A is added to the sample vial and the vial is closed and sealed. The vial is heated to 50° C. in a metal block and stirred for 16 hours. The vial is then removed from the block and cooled. A fresh solution (solution B) is prepared with exact volume ratios by mixing 2 parts of solution A and one part acetic acid. The vial closure is opened and 1.0 ml of solution B and 50 microliters of α,α,α-trifluorotoluene is added to the vial. The vial is closed and mixed well. A portion of the prepared solution is loaded into a NMR tube, and a NMR spectrum is recorded for analysis on a Bruker Avance 500 MHz instrument using conditions which provide quantitative signals for the fluorine 19 NMR experiment. Key NMR instrument conditions are; Pulse delay—5 sec.; Sweep width—32.795 ppm; Number of scans averaged—512; Number of points—65536; Line broading 2.0 Hz. The chemical shift is referenced at 13.0 ppm with the α,α,α-trifluorotoluene (TFT) signal. The area of the α,α,α-trifluorotoluene signal including the area of the spin bands and carbon 13 side bands is measured accurately along with the accurate area of the vinyl end group signal. If the vinyl end group signal is not baseline resolved from adjacent peaks, the area may be measured using curving fitting methods or other acceptable area measurement methods. In the formula below, a correction factor multiplier of 1.1 is used to correct the area of the vinyl end group to improve accuracy. The method standard deviation is 0.43 mmol/kg (μeq/g) at the 5.6 mmol/kg (μeq/g) vinyl end concentration and 0.11 mmol/kg (μeq/g) at the 0.76 mmol/kg (μeq/g) vinyl end group concentration.

Representative calculations are shown in below;

$$\text{mmols/kg vinyl end groups} = \frac{(\text{Area vinyl end group peak}) * 1.1 * 0.0595 * 1,000,000}{(\text{Area of } TFT \text{ peak}) * 146.1 * (\text{Sample weight in grams})}$$

The free AA values described throughout this description are set forth in ppm units. The AA generation rates stated for this invention are set forth in ppm units. To determine the AA generation rates of any pellet or article, the following test method is employed. The pellet or article is melt processed in an extrusion plastometer at 295° C. for 5 minutes.

The free AA can be measured on solid particles or preforms. This test method is used to measure the level of free acetaldehyde in particles, powders, preforms, bottles, and any other form the polyester polymer composition may take. For purposes of measuring residual or free acetaldehyde, the sample is tested according to the method described below.

The test procedure for measuring the level of free acetaldehyde on a sample, whether a preform, pellet, powder, or other form is the ASTM # F2013-00 test method. Samples are cryogenically ground through a Wiley Mill equipped with a 1.0 mesh screen. The final ground material has a particle size less than 800 μm. A portion of a sample (0.20 g) is weighed into a 20-mL head-space vial, sealed and then heated at 150° C. for sixty minutes. After heating, the gas above the sealed sample of PET polymer is injected onto a capillary GC column. The acetaldehyde is separated, and the ppm of acetaldehyde present in the sample is then calculated. The amount of acetaldehyde calculated represents the amount of free or residual acetaldehyde present in the sample.

For measuring the acetaldehyde generation rate on preforms, it is sufficient to use the ASTM # F2013-00 Method as described above without subjecting the preforms to a further melt history since by virtue of making a preform, the pellets are melted in an extruder prior to injection molding. By melt extruding or injection molding, AA precursors in the polymer melt have the opportunity to convert to acetaldehyde.

The acetaldehyde generation rate can be measured on the solid particles. However, for purposes of measuring the acetaldehyde generation, the sample must undergo a second melt history (where the melt-phase polyester manufacturing is counted as the first melt history) in order to determine the level of acetaldehyde generated. If the sample is a particle or powder which has not undergone a melt step in addition to a prior melt phase manufacturing step, the sample is first treated according to the Sample Preparation procedure described below, after which the sample is submitted to the ASTM # F2013-00 test method for analysis.

Sample Preparation: For the purpose of measuring the acetaldehyde generation rate, and if the sample manufactured exclusively in the melt phase has not seen a melt history subsequent to melt phase polycondensation, it is prepared according to this method prior to submitting the sample to the ASTM # F2013-00 test. Samples of polymer powder (ground to pass a 3 mm screen) are heated in an oven at 115° C. under vacuum (25-30 in. Hg) with a 4 SCFH nitrogen purge for at least 48 h. Although overnight drying would be sufficient for water removal alone, which is all that is needed for solid-stated samples, this extended oven treatment also serves to desorb to about 1 ppm or less the residual AA present in the high IV powder after melt-phase-only synthesis prior to AA generation testing. If pellets have not been stripped beforehand of most of the residual AA (target: 1 ppm or less), it is necessary to desorb residual AA from the pellets. Pellets can be ground to pass a 2 mm screen prior to residual AA removal under the conditions described above. If grinding is not done, it would take longer and/or require a higher temperature to desorb residual AA from pellets to about 1 ppm or less, due to the larger particle size (longer diffusion path). Any suitable acetaldehyde devolatization technique can be employed on particles which reduces the level of free acetaldehyde down to about 1 ppm or less, including passing hot inert gas over the particles for a time period sufficient to reduce the residual acetaldehyde to the desired level. Preferably, the acetaldehyde devolatization temperature should not exceed 165° C., or more preferably, not exceed 160° C., or even more preferably, not exceed 150° C. The sample is then packed in a preheated Tinius Olsen extrusion plastometer using a steel rod. The orifice die is calibrated according to ASTM D 1238. A small amount of material is purged out the bottom, which is then plugged.

The piston rod assembly is put in the top of the barrel. A 225 g weight may be placed on top of the piston rod to hold the rod down inside of the barrel. The polymer is held at 295° C. for 5 minutes. The orifice plug is then removed from the bottom of the barrel. Via a large weight and operator pressure, the extrudate is pushed out of the barrel into an ice water bath. The extrudate is patted dry, sealed in a bag and placed in a freezer until the ASTM # F2013-00 test is performed.

Alternatively, a CEAST Model 7027 Modular Melt Flow instrument is used. An AA generation program is initiated that will maintain a temperature of 295° C. and will extrude the melted PET material in 5 minutes at a constant flow rate as defined in the firmware of the instrument. As the extrudate is pushed out of the barrel and into an ice water bath, the sample is collected, patted dry, sealed in a bag and placed in a freezer until the ASTM # F2013-00 test is performed.

Acetaldehyde can be generated in polyester resins with the Ceast Model 7027 Modular Melt Flow or any similar extrusion plastometer instrument. However, the Ceast 7027 instrument is preferred because the automated functions of this instrument reduce test variability by maintaining consistent contact times for the polymer inside the extrusion barrel. This particular model of instrument incorporates automated packing of the resin at the start of the test procedure. The instrument is equipped with a motorized platform that will push the material out of the barrel until the piston is at a specified height above the bottom of the barrel. The platform will then hold the piston rod in place, allowing the resin to heat up and generate acetaldehyde. At the end of the specified hold time, the platform extrudes the remainder of the resin out of the barrel while traveling at a constant speed. These steps eliminate the possibility of variability in results from packing the material through the final extrusion step. Variability in loading the polymer is reduced with the design of the barrel, but loading of the polymer is not automated.

Acetaldehyde can be generated in the above manner over a temperature range of 265° C. to 305° C. The most consistent results are obtained between 275° C. and 295° C. The length of time the resin is held inside the barrel shows good results when between 2 and 15 minutes. The range of 5 to 10 minutes shows the best repeatability and distinction between materials. For the AA generation numbers stated for this invention, 295° C. and 5 minutes were used.

Use of this method of acetaldehyde generation and testing allows for screening of polyester resins for acetaldehyde generation without needing large amounts of material for evaluations such as molding of bottle preforms. As little as 10 grams of material may be used in this process, making it ideal for testing laboratory samples.

In the process of the invention, polyester polymers may be manufactured from aromatic or aliphatic dicarboxylic acids, esters of dicarboxylic acids, anhydrides of dicarboxylic acids, acid chlorides of dicarboxylic acids, glycols, epoxides and mixtures thereof. Suitable polyester polymers may be manufactured from diacids such as terephthalic acid, isophthalic acid, and 2,6-naphthalenedicarboxylic acid, and mixtures thereof, and diols such as ethylene glycol, diethylene glycol, 1,4-cyclohexanedimethanol, 1,4-butanediol, 1,3-propanediol, and mixtures thereof.

The process of the present invention can produce polyethylene terephthalate (PET) polyesters, which include "modified" polyesters. Examples of suitable polyester polymers made by the process include polyalkylene terephthalate homopolymers and copolymers modified with one or more modifiers in an amount of 40 mole % or less, less than 15 mole %, or less than 10 mole %. Unless otherwise specified, a polymer includes both its homopolymer and copolymer variants. An example of an especially suitable polyester polymer is a polyalkylene terephthalate polymer, and preferred are polyethylene terephthalate polymers. By "modified" it is meant that the diacid component and/or diol component are substituted in part with one or more different diacid and/or diol components.

For example, the diol component such as ethylene glycol in the case of PET may be substituted in part with one or more different diol components, and/or the dicarboxylic acid component such as terephthalic acid in the case of PET may be substituted in part with one or more different dicarboxylic acid components. The mole percentage for all the diacid component(s) totals 100 mole %, and the sum of the mole percentages for the of all the diol components totals 100 mole %.

For example, the dicarboxylic acid component of the polyester may optionally be substituted with up to about 20 mole percent of one or more different dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid include: phthalic acid, isophthalic acid, naphthalene-2,6-dicarboxylic acid, 1,4-cyclohexanedicarboxylic acid, 1,3-cyclohexanedicarboxylic acid, stilbene dicarboxylic acid, cyclohexanediacetic acid, 1,12-dodecanedioic acid, diphenyl-4,4'-dicarboxylic acid, succinic acid, glutaric acid, adipic acid, azelaic acid, sebacic acid, and mixtures thereof. Polyester polymers may be prepared from two or more of the above dicarboxylic acids. Moreover, of the foregoing dicarboxylic acids, those that can exist as stereoisomers may be in their cis-form, trans-form, or as mixtures thereof.

In addition, for example, the diol component may optionally be substituted up to about 20 mole percent with one or more diols other than ethylene glycol. Such other diols include cycloaliphatic diols preferably having 6 to carbon atoms or aliphatic diols preferably having 3 to 20 carbon atoms. Examples of such diols include: diethylene glycol, triethylene glycol, 1,4-cyclohexanedimethanol, propane-1,2-diol, propane-1,3-diol, butane-1,4-diol, pentane-1,5-diol, hexane-1,6-diol, 3-methylpentane-2,4-diol, 2-methylpentane-1,4-diol, 2,2,4-trimethylpentane-1,3-diol, 2-ethylhexane-1,3-diol, 2,2-diethylpropane-1,3-diol, hexane-1,3-diol, 1,4-di(hydroxyethoxy)-benzene, 2,2-bis-(4-hydroxycyclohexyl)-propane, 2,4-dihydroxy-1,1,3,3-tetramethylcyclobutane, 2,2-bis-(3-hydroxyethoxyphenyl)-propane, 2,2-bis-(4-hydroxypropoxyphenyl)-propane, 1,2-cyclohexanediol, 1,4-cyclohexanediol, and mixtures thereof. Polyesters may be prepared from two or more of the above diols. Moreover, of the foregoing diols, those that can exist as stereoisomers may be in their cis-form, trans-form, or as mixtures thereof. It should be noted in this respect that the presence of ethylene glycol residues, —OCH$_2$CH$_2$O—, is paramount, since in the absence of such residues, acetaldehyde generation does not occur.

The polyester polymers of this invention may optionally contain polyfunctional monomers, e.g., trifunctional or tetrafunctional comonomers such as trimellitic anhydride, trimellitic acid, trimethylolpropane, pyromellitic dianhydride, pentaerythritol, and the like. However, these are not generally preferred, and when used, are generally used in most minor amounts.

The polyester polymers of this invention may optionally contain certain agents which color the polymer. For example, a bluing toner can be added to the melt in order to reduce the b* of the resulting polyester polymer. Such bluing agents include blue inorganic and organic toners. In addition, red toners can also be used to adjust the a* color. Examples of toners include cobalt (II) compounds, such as cobalt (II) carboxylates. Other examples include red and blue toners described in U.S. Pat. Nos. 5,372,864 and 5,384,377. The manner by which toners are introduced into the polyester polymer is not limited nor is the amount of toner limited.

The polyester polymers of this invention may optionally contain additives normally used in polyesters. Such additives include, but are not limited to colorants, pigments, carbon black, glass fibers, fillers, impact modifiers, antioxidants, stabilizers, flame retardants, reheat aids, and the like. Still other examples of additives which enhance the performance properties of the polyester polymer include crystallization aids, impact modifiers, surface lubricants, denesting agents, antioxidants, ultraviolet light absorbing agents, colorants, nucleating agents, sticky bottle additives such as talc, and fillers.

The polyester compositions of the invention can be prepared by polymerization procedures known in the art sufficient to effect esterification and polycondensation. Polyester melt phase manufacturing processes include condensation of at least one dicarboxylic acid with at least one diol, optionally in the presence of esterification catalysts, in an esterification zone, followed by polycondensation in the presence of a polycondensation catalyst in a polymerization zone, which may in some instances be divided into a prepolymer zone and in the finishing zone; or ester exchange, usually in the presence of a transesterification catalyst in the ester exchange zone, followed in the presence of a polycondensation catalyst by a prepolymerization zone and finishing zone. Each of the polymers obtained may optionally be solid stated according to known methods.

To further illustrate, a mixture of one or more dicarboxylic acids, preferably aromatic dicarboxylic acids, or ester forming derivatives thereof, and one or more diols, are fed to an esterification reactor or ester exchange reactor operated at a temperature of between about 200° C. and 300° C., typically between 240° C. and 285° C. for direct esterification, and at a pressure of between about 1 psig up to about 70 psig. The residence time of the reactants typically ranges from between about one and five hours. The melt phase reaction proceeds in batch, semi-batch, or continuous mode. Preferably, the process of the invention is continuous. Normally, the dicarboxylic acid(s) is/are directly esterified with diol(s) at elevated pressure and at a temperature of about 240° C. to about 270° C. The esterification reaction or ester exchange reaction is continued until a degree of esterification of at least 70% is achieved, but more typically until a degree of esterification of at least 85% is achieved to make the desired monomer and/or oligomers. The formation of monomer and/or oligomer is typically uncatalyzed in the direct esterification process and catalyzed in ester exchange processes.

Polycondensation catalysts may optionally be added in the esterification zone along with esterification/ester exchange catalysts. If the polycondensation catalyst forms an insoluble salt with the dicaroxylic acid(s), the catalyst may be added after the esterification zone. If a slower production rate results after adding the polycondensation catalyst in the esterification zone, the catalyst should be added after the esterification zone. If a polycondensation catalyst is added to the esterification zone, it is typically blended with one or more of the diol components and fed as a mixture into the esterification reactor. Typical ester exchange catalysts which may be added to the ester exchange zone or reactor(s), and which may be used separately or in combination include titanium alkoxides, tin (II) or (IV) esters, alkali metals or alkali earth metals, such as lithium or calcium, manganese compounds, zinc compounds, magnesium acetates or benzoates, and/or other such catalyst materials as are well known to those skilled in the art. Additionally, phosphorus containing compounds and some colorants may also be present in the esterification zone. Phosphorus containing compounds are generally not recommended to be present in an ester exchange zone as the ester exchange catalysts may be deactivated prematurely, and more desirably, phosphorus containing compounds are not added to the esterification zone or to the monomer/oligomer composition produced from the esterification zone, whether the esterification is direct esterification of ester exchange.

In the instance where the polyester polymer is a PET polymer, the resulting polyester oligomer melt formed in the esterification zone and/or ester exchanger zone may include bis(2-hydroxyethyl) terephthalate (BHET) monomer, low molecular weight oligomers, diethylene glycol (DEG), and trace amounts of water as the condensation by-product not removed in the esterification zone, along with other trace impurities from the raw materials and/or possibly formed by catalyzed side reactions, and other optionally added compounds such as toners and stabilizers. The relative amounts of BHET and oligomeric species will vary depending on whether the process is a direct esterification process in which case the amount of oligomeric species are significant and even present as the major species, or an ester exchange process in which case the relative quantity of BHET predominates over the oligomeric species. The water is removed as the esterification reaction proceeds in order to drive the equilibrium toward products. The alcohol produced by the ester raw material is removed as the ester exchange reaction proceeds in order to drive the equilibrium toward products. In the case of dimethylterephthalate, the alcohol removed is methanol. The esterification zone typically produces the monomer and oligomer mixture continuously in a series of one or more reactors. Alternatively, the monomer and oligomer mixture could be produced in one or more batch reactors. It is understood, however, that in a process for making polyethylene naphthalate polymers (PEN), the reaction mixture will contain the monomeric species bis(2-hydroxyethyl)naphthalate and its corresponding oligomers, in lieu of BHET and its corresponding oligomers which will be present when making PET.

At this stage in the process, the It.V. is usually not measurable or is less 0.1 dl/g. The average degree of polymerization of the polyester oligomer melt is typically less than 15 and may be less than 7.0.

Once the desired degree of esterification is completed, the reaction mixture (i.e. the polyester oligomer melt) is transported from the esterification reactors in the esterification zone to the polycondensation zone, which may comprise a prepolymer zone and a finishing zone. Polycondensation reactions occur in the melt phase in the prepolymerization zone and finished in the melt phase in the finishing zone, after which the melt is solidified into product, or optionally solidified in the form of chips, pellets, or any other shape. The solid particles can be optionally crystallized before or after cutting.

The prepolymerization and finishing zones may comprise a series of one or more distinct reaction vessels operating at different conditions, or the zones may be combined into one reaction vessel using one or more sub-stages operating at different conditions in a single reactor. That is, the prepolymerization zone can involve the use of one or more reactors operated continuously, one or more batch reactors, or even one or more reaction steps or sub-stages performed in a single reactor vessel. In some reactor designs, the prepolymerization zone represents the first half of polycondensation in terms of reaction time, while the finishing zone represents the second half of polycondensation. While other reactor designs may adjust the ratio of residence time in the finishing zone to that in the prepolymerization zone to be about a 1.5:1 or higher, a common distinction in many designs between the prepolymerization zone and the finishing zone is that the latter zone frequently operates at a higher temperature and/or lower pressure than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

In the specific instance where the polyester polymer melt is a polyalkylene terephthalate or more specifically a polyethylene terephthalate, the prepolymerization zone generally comprises a series of one or more vessels and is operated at a temperature of between about 260° C. and 300° C. for a period between about five minutes to four hours. Within this zone, the It.V of the monomers and oligomers comprising the polyester polymer melt at the start of the zone is increased up to about no more than 0.48 dL/g. As the It. V increases, the diol byproduct or byproducts are removed from the polyester polymer melt using an applied vacuum ranging from 350 mmHg to 0.2 mmHg in order to push the equilibrium toward products. In this regard, the polyester polymer melt may subjected to agitation, for example by a stirring mechanism, to promote the removal of diols from the melt. As the melt is fed into successive vessels, the molecular weight and thus the It.V. of the polymer melt increases. The pressure of each vessel can be generally decreased to promote evaporation of diol allowing for a progressive increase in polymerization in each successive vessel or in each successive zone within a vessel. Alternatively, to promote removal of glycols, water, alcohols, aldehydes, and other reaction products, the reactors can be purged with an inert gas. Inert gas is any gas which does not cause unwanted reaction or product characteristics at reaction conditions. Suitable gases include, but are not limited to argon, helium and nitrogen.

In the prepolymerization zone, also known in the industry as the low polymerizer, the low molecular weight monomers and oligomers can be polymerized via polycondensation to form polyethylene terephthalate polyester prepolymer (or PEN polyester, etc.) in the presence of a catalyst. If one or more polycondensation catalysts were not added in the esterification stage, the polycondensation catalyst can be added in this zone to catalyze the reaction between the monomers and low molecular weight oligomers to form prepolymer and remove the diol as a by-product.

There are numerous polycondensation catalysts known in the art. For example, polycondensation may proceed in the presence of at least one catalytically active metal compound such as titanium, aluminum, antimony, germanium, cobalt, alkali metals, and alkaline earth metals, magnesium, and calcium. In one embodiment, the polyester polymer is devoid of catalytically active compounds of cobalt, germanium, antimony, calcium, activated carbon, and/or magnesium added to the melt phase process for manufacturing the polyester polymer.

In one embodiment, there is provided a titanium catalyst, preferably in the presence of from about 3 ppm (parts per million) to about 35 ppm of titanium from the catalyst, more preferably about 4 to 15 ppm titanium from the catalyst, and most preferably 5 to 10 ppm Ti, in each case based on the weight of titanium in the polyester polymer melt.

The titanium catalyst may be any titanium compound which promotes a reasonable polycondensation rate. Preferably, the catalyst exhibits at least the same rate of polycondensation as is achieved using antimony triacetate or antimony trioxide that are examples of known polycondensation catalysts used in the commercial manufacture of PET, and more preferably exhibits a considerably greater rate of polycondensation in the absence of deactivator compounds such as phosphoric acid. A suitable polycondensation catalyst such as a titanium catalyst can be added anywhere in the melt phase process, such as into the esterification zone or the polycondensation zone. Preferably, the chosen addition point will not result in a decrease in polycondensation rate, that is a decrease in IV build-up, relative to other possible addition points. It is preferably added after at least 90% conversion in the esterification zone, or after completing esterification (which includes ester exchange), or between the esterification zone and the polycondensation zone, or to the beginning of the polycondensation zone, or during the prepolymerization zone, preferably during the first half of the prepolymerization zone, and more preferably during the first quarter of the prepolymerization zone (relative to residence time in the zone).

Examples of suitable titanium catalysts for polycondensation include, in general, titanium (IV) compounds which are alkoxides, glycolates, acetates, oxalates, etc. Alkoxides and mixed glycolate alkoxides are preferred. Titanium (IV) isopropoxide is an example of a preferred catalyst. Many such catalysts are available commercially, i.e., under the trademark Tyzor® titanates from DuPont. Solid titanium compounds which serve as heterogenous catalysts are also suitable, including those disclosed in U.S. Pat. No. 5,656,716. Titanium oxides and hydrated oxides may become solubilized during the course of the polymerization, for example by complexation and/or reaction with any diol component. If catalysts remain insoluble, at least in part, catalytic activity would be a concern, as would haze (lack of clarity). Soluble catalysts are preferred, more preferably, those catalysts which are soluble at the outset of the reaction. The titanium catalyst may be introduced into the reaction in any convenient manner. A solution of the catalyst in alcohol or a solid-liquid mixture (slurry) of the catalyst in ethylene glycol may be used, for example, as may be a solution or slurry of the catalyst in an oligomer mixture. The catalyst may also be added alone, and distributed by agitation, for example, by mechanical mixing or by use of a static mixer.

In another example, a suitable polycondensation catalyst may be an aluminum compound. Catalytic aluminum compounds may be added to the melt phase process as a compound (which includes a salt or a complex) or as a metal provided that it is ultimately active as a catalyst in the polycondensation phase either alone or in combination with the alkali metal or alkaline earth metal atoms or compounds. Aluminum oxides are not included within the meaning of an aluminum compound or metal Desirable are aluminum compounds that can be dissolved in a diluent or a carrier that is volatile and/or reactive with the polyester forming ingredients. Suitable liquid reactive carriers can have any molecular weight, such as those ranging from 62 to about 10,000 grams per mole. Aluminum compounds can also be added as slurries or suspensions in a liquid that is volatile and/or reactive with the polyester forming ingredients. Aluminum can also be added to the melt phase process by melt blending the aluminum compound with a polyester polymer in a suitable extruder or other device to form a concentrate, and subsequently, preferably melting the concentrate as a molten feed to the melt phase process. A preferred mode of addition of aluminum compounds is addition to a catalyst mix tank, which is part of the polyester melt phase process equipment. Preferably, the catalyst mix tank also contains an alkali metal compound or an alkaline earth compound or alkali compound as well as a suitable solvent or dispersing agent.

The aluminum compound may be added to the esterification zone, to the oligomer mixture exiting the esterification zone, or at the start of polycondensation, or to the polyester melt during polycondensation, and preferably as noted above after about 75% conversion in the esterification zone. An aluminum compound is added preferably when the percent conversion of the acid end groups in the esterification zone is at least 75%, more preferably when the % conversion of the acid end groups is at least 85%, and most preferably when the % conversion of the acid end groups from esterification is at least 93%. However, since aluminum operates as a polycondensation catalyst, it is desirable to add aluminum to the polyester melt after the monomer/oligomer melt exits the esterification reactors and is added between the esterification zone and the polycondensation zone, or at the initiation of or to the prepolymerization zone (the first stage of polycondensation) to provide the benefit of shorter reaction time or a higher molecular weight build-up.

In a preferred embodiment, an aluminum compound is added to the oligomer mixture upon or after completion of the esterification zone or to a polyester melt no later than when the It.V. of the melt reaches 0.3 dL/g, or no later than when the It.V. of the melt reaches 0.2 dL/g, and more preferably to the oligomer mixture exiting the esterification zone or prior to commencing or at the start of polycondensation, which is to or within the prepolymerization zone as the first stage of polycondensation (the finishing zone being the second and last stage of polycondensation).

Suitable aluminum compounds as polycondensation catalysts include aluminum compounds with at least one organic substituent. Illustrative examples of suitable compounds include those of the formula:

Al[OR]$_a$[OR']$_b$[OR'']$_c$[R''']$_d$ wherein R, R', R'' are independently an alkyl group, aryl group, acyl group or hydrogen, where preferably at least one of R, R' R'' and R''' is not hydrogen, R''' is an anionic group, and a, b, c, d are independently 0 or positive integers, and a+b+c+d is equal to 3 or no greater than 3.

Suitable examples of aluminum compounds include the carboxylic acid salts of aluminum such as aluminum acetate, aluminum benzoate, aluminum lactate, aluminum laurate, aluminum stearate, aluminum alcoholates such as aluminum ethylate, aluminum isopropylate, aluminum tri n-butyrate, aluminum tri-tert-butyrate, mono-sec-butoxyaluminum diisopropylate, and aluminum chelates in which the alkoxy group of an aluminum alcoholate is partially or wholly substituted by a chelating agents such as an alkyl acetoacetate or acetylacetone such as ethyl acetoacetate aluminum diisopropylate, aluminum tris(ethyl acetoacetate), alkyl acetoacetate aluminum diisopropylate, aluminum monoacetylacetate bis (ethyl acetoacetate), aluminum tris(acetyl acetate), aluminum acetylacetonate.

Preferred among the aluminum compounds are the basic carboxylic acid salts of aluminum and aluminum alcoholates, Basic carboxylic acid salts of aluminum include monobasic and dibasic compounds. The basic aluminum acetate used can be either the diacetate monohydroxy compound or the monoacetate dihydroxy compound or a mixture thereof. In particular, basic aluminum acetate and aluminum isopropoxide are preferred aluminum compounds. Stabilizing basic aluminum acetate with boric acid may in some instances increases its solubility. Aluminum isopropoxide is most desirable.

An amount of aluminum atoms is added to effect polycondensation. Preferred amounts are effective to polycondense at a reasonable rate. A reasonable rate is one at which a polyester line can be operated at and still return the cost of capital. More preferred, a reasonable rate is at least that achieved with 250 ppm Sb. The amount generally ranges from at least 2 ppm, or at least 5 ppm, or at least 10 ppm, or at least 15 ppm, or at least 20 ppm, or at least 30 ppm, and up to about 150 ppm, or up to about 100 ppm, or up to about 75 ppm, or up to about 60 ppm Al based on the weight of the polymer. When used in combination with alkali or alkaline earth metal, a portion of which can be added to the esterification zone, increasing the alkali metal or alkaline earth metal to aluminum mole ratio (M:Al) may increase the polycondensation rate; therefore, low Al loadings may give a reasonable rate with moderate to high M:Al, while giving slow rates at low M:Al mole ratio. The preferred range of aluminum is from 3 ppm to 60 ppm, and a more preferable range is 5 to 20 ppm. Other suitable amounts include at least from 3 ppm, or at least from 5 ppm, or at least from 7 ppm, or at least from 10 ppm; and up to 60 ppm, or up to 40 ppm, or up to 30 ppm Al, or up to 25 ppm, or up to 20 ppm, or up to 18 ppm, or up to 16 ppm, or up to 15 ppm.

Aluminum compounds can be used in combination with alkali metal or alkaline earth metal. The latter can optionally be present or added to the esterification zone or at any point where the addition of aluminum compounds is made. Alkali metal or alkaline earth metal refers to metals in Group IA and Group IIA of the periodic table, including but not limited to Li, Na, K, Rb, Cs, Mg, Ca, Sr, and preferably Li, Na or K. The metals may be added to the melt phase as metal compounds (which includes a complex or a salt) having counter ions, among which the preferred counter ions are hydroxides, carbonates, and carboxylic acids.

The ratio of the moles of alkali metal or moles of alkaline earth metal or moles of alkali to the moles of aluminum (M:Al) generally ranges from at least 0.1, or at least 0.25, or at least 0.5, or at least 0.75, or at least 1, or at least 2, and up to about 75, up to about 50, up to about 25, up to about 20, up to about 15, up to about 10, or up to about 8, or up to about 6, or up to about 5. To determine the particular amount of aluminum and which M:Al molar ratio to employ, consideration is taken to the desired reaction rate, which is influenced by temperature in the polycondensation zone, color, clarity and AA generation rate exhibited in the final polymer.

From the prepolymerization zone, once an It.V. of no more than about 0.48 dL/g is obtained, the polyester polymer melt product from the prepolymerization zone is fed to a polycondensation finishing zone where the polycondensation is continued further in one or more finishing vessels generally, but not necessarily, ramped up to higher temperatures than present in the prepolymerization zone. For example, the temperature within the finishing zone may be raised to a value within a range of from 270° C. to 305° C. until the It.V. of the melt is increased from the It.V. of the melt in the prepolymerization zone (typically 0.20 to 0.30 dL/g but usually not more than 0.48 dL/g) to an It.V in the range of from about 0.54 dL/g to about 1.2 dL/g. The final vessel, generally known in the industry as the "high polymerizer," or "finisher," is usually operated at a pressure lower than used in the prepolymerization zone, e.g. within a range of between about 0.2 and 4.0 torr. Although the finishing zone typically involves the same basic chemistry as the prepolymer zone, the fact that the size of the molecules, and thus the viscosity differs, means that the reaction conditions also differ. However, like the prepolymer reactor, each of the finishing vessel(s) is operated under vacuum or inert gas, and each typically has some sort of mixing or surface renewal to promote the removal of ethylene glycol.

In accordance with the present invention, at least one additive compound comprising a catalyst deactivator compound is added to the polyester polymer melt after said polyester polymer melt has reached an It.V. of at least 0.45 dl/g, or at least 0.55 dL/g, or at least 0.55 dL/g, or at least 0.60 dL/g, or at least 0.65 dL/g, or at least 0.68 dL/g, or at least 0.70 dL/g, or at least 0.72 dL/g, or at least 0.74 dL/g, or at least 0.76 dL/g, or at least 0.80 dL/. The addition of the catalyst deactivator desirably occurs near the discharge of the polycondensation finishing zone or just after it but prior to cutting, although addition of the catalyst deactivator could occur at any point within the melt phase consistent with a polyester polymer melt with a sufficiently high value of It.V.

Stabilizing or deactivating the catalyst late or near the end of a melt phase process is optionally followed by additional build up on It.V. followed by the production of polyester particles after solidification of the polyester polymer melt. There are many desirable characteristics for the polyester polymer melt and for the subsequent solid polyester particles produced. For example, one normally desirable feature of the polyester is a low concentration of residual or free AA in the solid polyester particles and a low generation rate of AA upon melting said particles. For example, in carbonated soft drink ("CSD") and water bottle applications, polyester particles and more specifically PET polyester pellets are often formed into bottle performs. AA that is liberated during forming of bottle performs may impart a noticeable and possibly undesirable taste to the beverage. Acceptable AA concentrations may vary among the possible applications for the polymer. One advantage of this invention is the ability to produce polyester polymer wherein the AA generation rate in polyethylene terephthalate polymers is sufficiently low to be acceptable for water bottle applications while at the same time having the It.V. required for CSD bottle applications, hence, a dual use resin.

Another example of a usual desirable characteristic of the polyester polymer melt and any subsequent polyester particles produced by solidification of the melt is that of low vinyl ends concentration. Vinyl ends as represented by the formula: $-CO_2-CH=CH_2$ are known AA precursors. One commonly accepted mechanism by which AA is generated in molten polyester containing ethylene glycol residues in at least some of the repeat units is by the internal chain scission of a polyester polymer chain to form a vinyl end group (VEG) and a carboxylic acid end group. The VEG can react with a hydroxyethyl end group (HEG) to form residual or free AA and a new internal ester linkage. There is a common perception that a high concentration of vinyl ends is thus undesirable due to the ability of the vinyl end to react and form AA during subsequent melt processing of the solid polyester polymer particles. For example, AA may not only form during the melt phase manufacturing process of polyester polymers but also may occur during injection molding that uses PET particles (e.g. pellets) to make bottle preforms. One advantage of the present invention is the production of a polyester polymer that eliminates the need for addition of an AA scavenger or other AA lowering additive prior to or during injection molding of PET preforms or melt processing into other articles. Further, there is a general tendency to operate melt phase polyester polymerization processes at low temperatures and low production rates to inhibit subsequent generation of AA in downstream processing applications. Another advantage of the present invention is that this general tendency is no longer as critical.

Further, U.S. Pat. No. 5,852,164 indicates that the concentration of olefin terminals or end groups, which is the sum of the vinyl ends, the vinylidene ends, and the methyl cyclohexene ends, is preferred to be less than 25 eq/ton in order to improve the melt heat stability of highly modified polyester polymers, which contain in almost all of the examples about 33 mole % of 1,4-cyclohexanedimethanol, based on the total diol content. In general, it is undesirable, especially in molding processes, for the intrinsic viscosity of the polymer to decrease upon heating as the properties of the resulting article or part will be negatively impacted. For example, in the production of bottles and/or performs which is typically made without addition of modifiers (unmodified) or slightly modified polyester polymer, and in particular beverage bottles such as carbonated soft drink or water bottles are made from the particles of the invention and the It.V. difference between the It.V. of the particles and the It.V of the preforms and/or bottles usually is not more than 0.04 dL/g, preferably not more than 0.03 dL/g, and most preferably not more than 0.02 dL/g. Additionally, it is known that vinyl ends may also polymerize under extreme conditions to polyvinyl esters which may be responsible for yellow coloration of PET.

However, we have surprisingly found that the addition of a catalyst deactivator leads to production of a polyester polymer and subsequent polyester particles with a relatively high concentration of vinyl ends in the polymer and a comparatively low generation rate of AA at melt temperatures, wherein the concentration of vinyl ends does not have an appreciable negative impact on the quality of the polyester polymer. Further, there is an embodiment, in which the lowest levels of AA generation or preform AA are not needed, that allows a shorter polycondensation duration or faster production rate and creates a product of suitable It.V. without solid stating.

The polyester polymer may also contain a catalyst deactivator. By a catalyst deactivator is meant a compound effective to at least partially deactivate or inhibit the activity of the catalyst system. A compound is effective to at least partially deactivate the catalyst system when by its addition at a given level, and solely for testing the effectiveness of a compound at a given level, when either or both a) the rate of solid-stating under actual operating conditions is reduced relative to the same polymer without the deactivator ("no additive case")

and/or b) when added earlier, the rate of melt-phase polycondensation under actual operating conditions to a constant It.V. target is reduced, that is, it takes more time to reach the It.V. target, or the It.V. of the polymer is reduced at constant time relative to the no additive case. Preferably, the catalyst deactivator also reduces the rate of AA generation upon melting particles, relative to the no additive case, to lower the contribution of AA generation to AA levels in a molded article, such as a preform, relative to a no additive case, and more preferably this lower amount of AA generated occurs upon melting polyester particles having an It.V. of at least 0.72 dL/g obtained from a melt phase polymerization.

The catalyst deactivator is added late during the process for manufacturing the polymer melt in order to limit the activity of catalyst system during subsequent melt processing steps, in which the catalyst system would otherwise catalyze the conversion of acetaldehyde precursors present in the polymer particles to acetaldehyde and/or catalyze the formation of more AA precursors and their subsequent conversion to AA. Left untreated, the polymer would have a high acetaldehyde generation rate during extrusion or injection molding, thereby contributing to an increase in the AA levels in articles made from the melt. The stabilizer or deactivator can also help thermally stabilize the polymer melt near the end of melt phase polycondensation and during subsequent melting of polyester particles, which occurs, for example, during melt processing into articles, without which it is possible that more reactions would occur to cleave the polymer chains in the highly viscous melt, a route to forming more AA precursors and ultimately, more AA. Any side reaction at least partially catalyzed by the polycondensation catalyst system may be less of a problem when the polycondensation catalyst system is at least partially deactivated. The catalyst deactivator is not added along with the addition of aluminum compounds or alkali metal compounds or alkaline earth metal compounds or alkali compounds, nor is it added at the commencement of polycondensation because it would inhibit the catalytic activity of the metal catalysts and hence, the rate of polycondensation. It should be noted, however, that not all types or forms of phosphorus compounds are deactivators, and if they are not, they may, if desired, be added along with the catalyst or at the commencement of polycondensation.

Suitable deactivating compounds are preferably phosphorus containing compounds. The phosphorus compounds contain one or more phosphorus atoms. Preferred are phosphate triesters, acidic phosphorus compounds or their ester derivatives, and amine salts of acidic phosphorus containing compounds. Acidic phosphorus compounds have at least one oxyacid group, that is, at least one phosphorus atom double-bonded to oxygen and single-bonded to at least one hydroxyl or OH group. The number of acidic groups increases as the number of hydroxyl groups, bound to the phosphorus atom that is double-bonded to oxygen, increases.

Specific examples of phosphorus compounds include phosphoric acid, pyrophosphoric acid, phosphorous acid, polyphosphoric acid, carboxyphosphonic acids, alkylphosphonic acids, phosphonic acid derivatives, and each of their acidic salts and acidic esters and derivatives, including acidic phosphate esters such as phosphate mono- and di-esters and non-acidic phosphate esters (e.g. phosphate tri-esters) such as trimethyl phosphate, triethyl phosphate, tributyl phosphate, tributoxyethyl phosphate, tris(2-ethylhexyl) phosphate, oligomeric phosphate tri-esters, trioctyl phosphate, triphenyl phosphate, tritolyl phosphate, (tris)ethylene glycol phosphate, triethyl phosphonoacetate, dimethyl methyl phosphonate, tetraisopropyl methylenediphosphonate, mono-, di-, and tri-esters of phosphoric acid with ethylene glycol, diethylene glycol, or 2-ethylhexanol, or mixtures of each. Other examples include distearylpentaerythritol diphosphite, mono- and di-hydrogen phosphate compounds, phosphite compounds, certain inorganic phosphorus compounds that are preferably soluble in the polymer melt, poly(ethylene) hydrogen phosphate, and silyl phosphates. Haze in solutions of particles or in molded parts is one indication of the lack of solubility or limited solubility of an additive in the polymer melt. Soluble additives are more likely to deactivate/stabilize the catalyst system. In addition, haze in molded parts is undesirable if it exceeds acceptable limits and/or is detrimental to the visual appearance of the molded part.

Other phosphorus compounds which may be added include the amine salts of acidic phosphorus compounds. The amines may be cyclic or acyclic, may be monomeric, oligomeric, or polymeric, and should be selected so as to minimize haze and/or maximize solubility when these are issues. The organic constituents of the amine may in principle be any organic group. Ammonia and related compounds like ammonium hydroxide are suitable.

Suitable organic groups on the amine include linear and branched alkyl, cycloalkyl, aryl, aralkyl, alkaryl, heteroaryl, etc. Each of these types of organic groups may be substituted or unsubstituted, i.e. with hydroxy, carboxy, alkoxy, halo, and like groups. The organic groups may also contain carbonate, keto, ether, and thioether linkages, as well as amide, ester, sulfoxide, sulfone, epoxy, and the like. This list is illustrative and not limiting.

Preferred amines are cyclic amines having a 5 to 7 membered ring, preferably a six membered ring. These rings may constitute a single "monomeric" species, or may be part of a larger oligomer or polymer.

Preferred cyclic amines are hindered amines which have organic groups substituted at ring positions adjacent to the ring nitrogen. The ring nitrogen itself may also be substituted, i.e. by alkyl, aryl, aralkyl, alkaryl, and other groups. The hindered amines may also comprise a portion of an oligomeric moiety or polymeric moiety.

Another type of preferred amines are amino acids. Amino acids with decomposition points at or above polymerization temperatures are especially preferred. The L-enantiomer, the D-enantiomer or any mixture thereof, including racemic mixtures, may be used. The amine group and the carboxylic acid group do not have to be attached to the same carbon. The amino acids may be alpha, beta or gamma. Substituted amino acids may be used. Amino acids with some solubility in water are especially preferred as this allows the synthesis of the salt to be done in water, that is, without VOC's (volatile organic compounds).

Suitable amines contain at least one nitrogen capable of salt formation with a phosphorus-containing acid. In hindered amines containing N-alkylated piperidinyl moieties, for example, salt formation may involve the piperidinyl nitrogen, generating species such as (but not limited to):

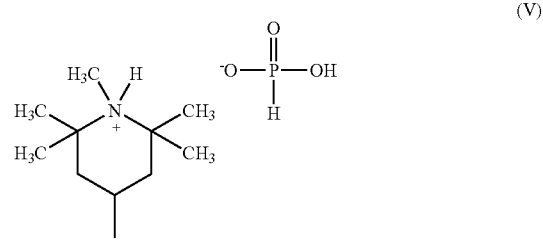

(V)

When there is one nitrogen in the amine compound that can form a salt, one mole of phosphorus-containing acid is used per mole of amine compound. When there are two or more nitrogen atoms in the amine compound that can form salts, two or more moles of acid can be used per mole of amine compound, up to an amount of acid, which creates salts having no remaining neutralizable nitrogen, or slightly in excess of this amount.

The carboxylic acid group of the amino acid opens up the possibility that the amine portion of the salt might be reacted into the polyester chain. Reaction into the polyester chain should result in less volatility and less extractability. Reaction into the polyester chain can also be accomplished if the amine portion of the salt contains a hydroxyl and/or a carboxyl group. If there is only 1 carboxyl or hydroxyl group, the salt could function as an end-capper. If there are a total of 2 or more reactive groups (carboxyl or hydroxyl), the salt may not always be at the end of the chain. Reaction into the polyester chain is also possible for the phosphorus-containing portion of the salt. For example, phosphoric acid can react with hydroxyl compounds to form phosphate esters. The chain end of polyesters is often a hydroxyethyl end group. Phosphoric acid can also react in the middle of a polyester chain.

The precursor to the phosphorus moiety of the phosphorus salt may be any oxyacid of phosphorus including but not limited to hypophosphorous acid, phosphorous acid, phosphoric acid, polyphosophoric acid, polyphosphorous acids, pyrophosphoric acid, phosphinic acids, phosphonic acids, phosphate monoesters, phosphate diesters, phosphonate monoesters, pyrophosphate monoesters, pyrophosphate diesters, pyrophosphate triesters, or salts or compounds which still bear at least one acidic hydrogen, etc. The hydrogen on any OH group bound directly to the P=O group is acidic. Compounds with more than one acidic hydrogen may have one or more acidic hydrogens substituted with organic groups such as alkyl, aryl, aralkyl, alkaryl, etc., by polyether oligomers, polyester oligomers, etc. At least one salt-forming acidic hydrogen must remain, however. Oxyacids of phosphorus with one or more hydrogen bound directly to the P=O group may have one or more of these hydrogens substituted with organic groups such as alkyl, aryl, aralkyl, alkaryl, etc. Examples of these compounds include but are not limited to alkylphosphonic acids, alkylphosphinic acids and dialkylphosphinic acids. As with the amines, the organic groups may be substituted.

In one embodiment, the salts are prepared by the reaction of one or more acidic phosphorus-containing compounds with one or more basic organic compounds containing nitrogen, wherein the phosphorus-containing compounds are preferably selected from compounds having the formulas:

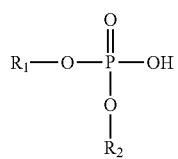

(1)

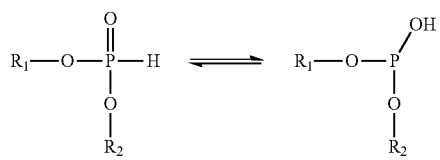

(2)

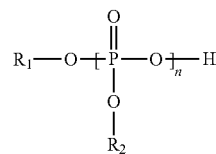

(3)

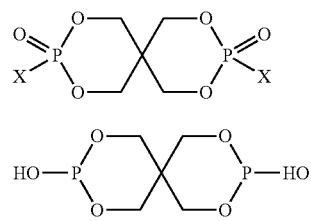

(4)

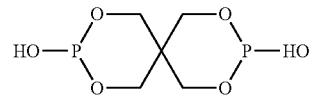

(5)

wherein $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

n is 2 to 500; and

X is selected from hydrogen and hydroxy;

and wherein the basic organic compounds containing nitrogen are preferably selected from compounds having the formulas:

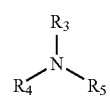

(1)

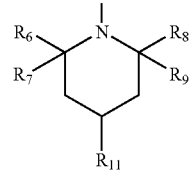

(2)

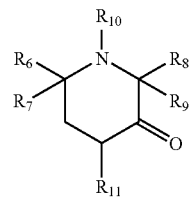

(3)

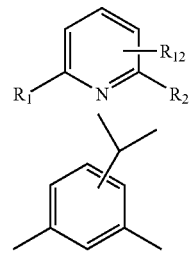

(4)

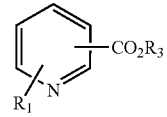

(6)

-continued
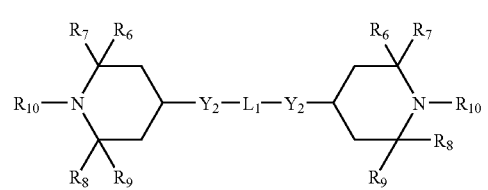
(7)
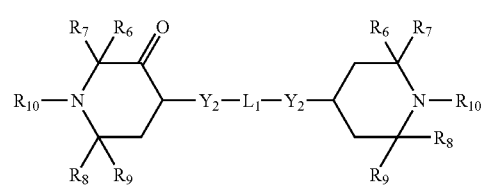
(8)
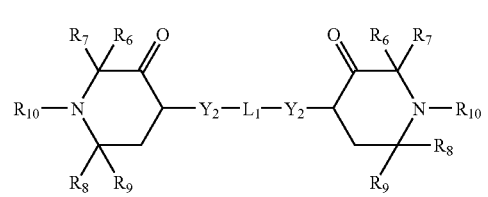
(9)
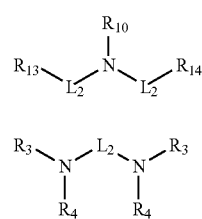
(10)
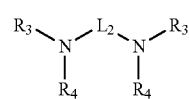
(11)
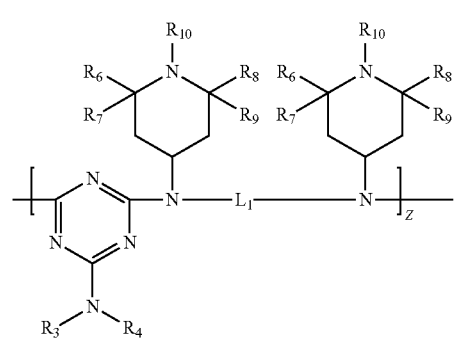
(12)
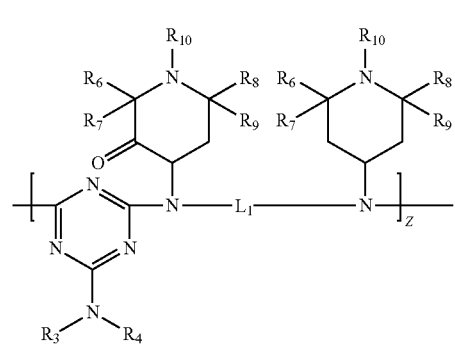
(13)
-continued
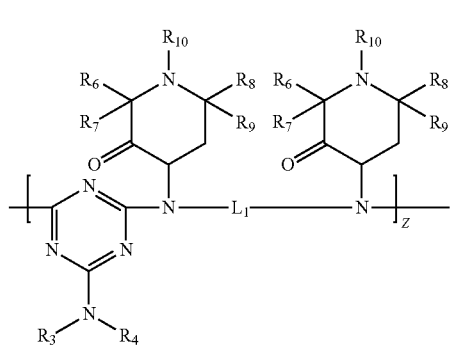
(14)
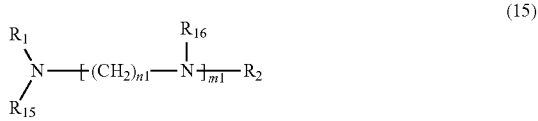
(15)
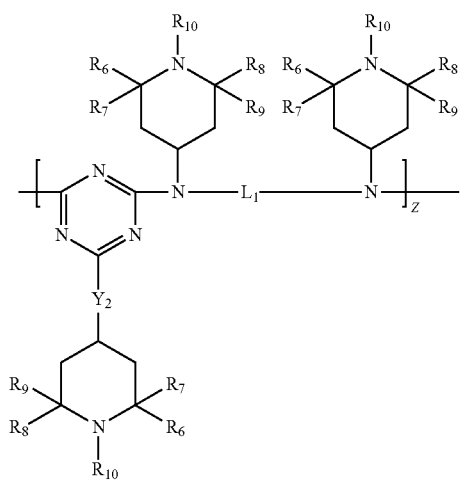
(16)
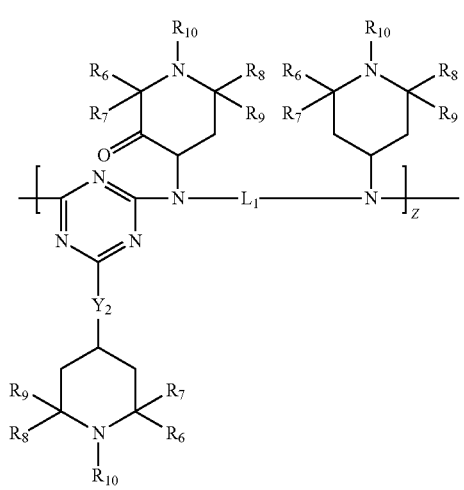
(17)

-continued

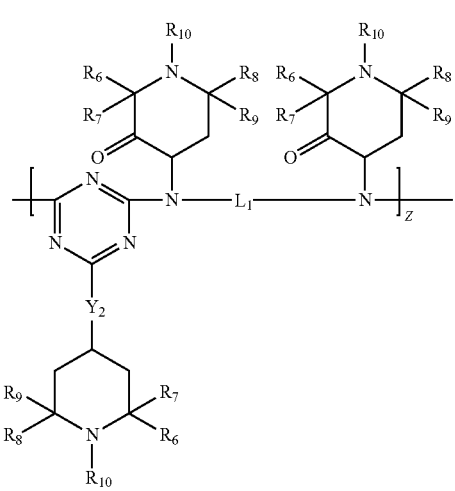

(18)

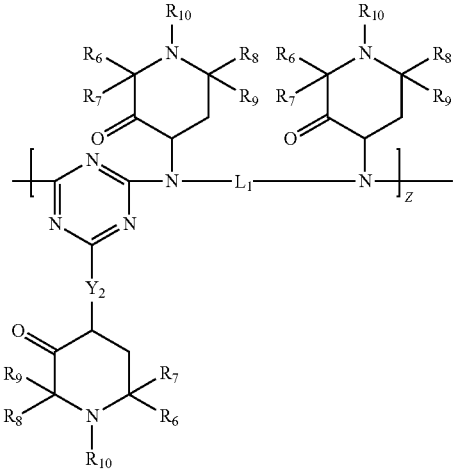

(19)

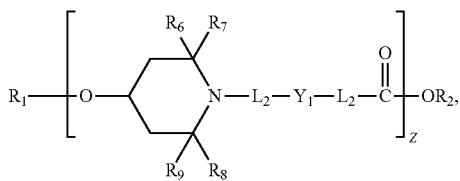

(20)

wherein:

R₁ and R₂ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

Each of the following types of organic groups may be substituted or unsubstituted, i.e. with hydroxy, carboxy, alkoxy, halo, and/or like groups, and any combination thereof. The organic groups may also contain carbonate, keto, ether, and thioether linkages, as well as amide, ester, sulfoxide, sulfone, epoxy, and the like. This list is illustrative and not limiting.

$R_3$, $R_4$, and $R_5$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein preferably, at least one of $R_3$, $R_4$, and $R_5$ is a substituent other than hydrogen; however, in the case where $R_3$, $R_4$, and $R_5$ are all hydrogen, ammonium hydroxide is the preferred form; $R_3$ and $R_4$ or $R_4$ and $R_5$ collectively may represent a divalent group forming a ring with the nitrogen atom to which they are attached, e.g., morpholino, piperidino and the like;

$R_6$, $R_7$, $R_8$, and $R_9$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl;

$R_{10}$ is selected from hydrogen, —OR₆, $C_1$-$C_{22}$-alkyl, substituted $C_1$-$C_{22}$-alkyl, $C_3$-$C_8$-cycloalkyl, substituted $C_3$-$C_8$-cycloalkyl;

$R_{11}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —Y₁—R₃ or a succinimido group having the formula

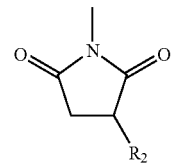

wherein $R_{12}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl and may be located at the 3 4 or 5 positions on the aromatic ring;

the —N(R₃)(R₄) group may be located at the 3, 4 or 5 positions on the pyridine ring of nitrogen compound (5);

the —CO₂R₃ and R₁ groups may be located at any of the 2, 3, 4, 5, 6 positions of the pyridine ring of nitrogen compound (6);

$L_1$ is a divalent linking group selected from $C_2$-$C_{22}$-alkylene; —(CH₂CH₂—Y₁)₁₋₃—CH₂CH₂—; $C_3$-$C_8$-cycloalkylene; arylene; or —CO-L₂-OC—;

$L_2$ is selected from $C_1$-$C_{22}$-alkylene, arylene, —(CH₂CH₂—Y₁)₁₋₃—CH₂CH₂— and $C_3$-$C_8$-cycloalkylene;

$Y_1$ is selected from —OC(O)—, —NHC(O)—, —O—, —S—, —N(R₁)—;

$Y_2$ is selected from —O— or —N(R₁)—;

$R_{13}$ and $R_{14}$ are independently selected from —O—R₂, and —N(R₂)₂;

Z is a positive integer of up to about 20, preferably up to about 6;

m1, is selected from 0 to about 10;

n1 is a positive integer selected from 2 to about 12;

$R_{15}$, and $R_{16}$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, and radical A wherein radical A is selected from the following structures:

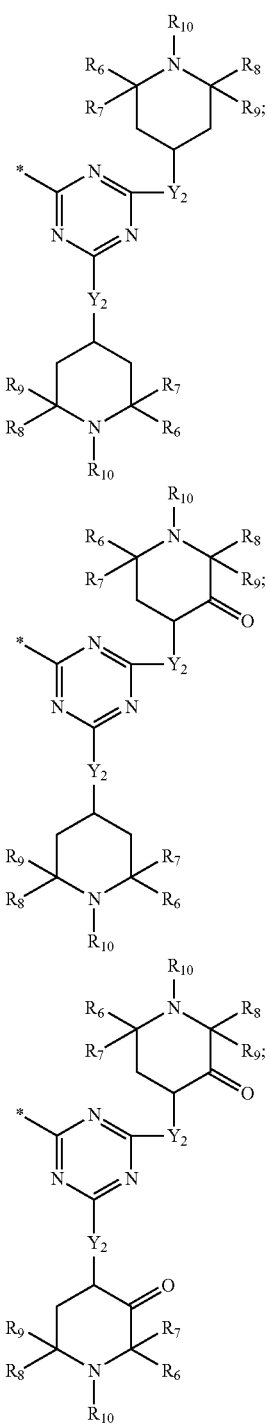

Radical A structures wherein * designates the position of attachment.

Preferably at least one of $R_{15}$ and $R_{16}$ is an A radical; and wherein the ratio of the number of phosphorus atoms in the acidic phosphorus-containing compound to the number of basic nitrogen atoms in the basic organic compound is about 0.05 to about 2, preferably from about 0.25 to about 1.1.

The term "$C_1$-$C_{22}$-alkyl" denotes a saturated hydrocarbon radical which contains one to twenty-two carbons and which may be straight or branched-chain. Such $C_1$-$C_{22}$ alkyl groups can be methyl, ethyl, propyl, butyl, pentyl, hexyl, heptyl, octyl, isopropyl, isobutyl, tertbutyl, neopentyl, 2-ethylheptyl, 2-ethylhexyl, and the like. The term "substituted $C_1$-$C_{22}$-alkyl" refers to $C_1$-$C_{22}$-alkyl radicals as described above which may be substituted with one or more substituents selected from hydroxy, carboxy, halogen, cyano, aryl, heteroaryl, $C_3$-$C_8$-cycloalkyl, substituted $C_3$-$C_8$-cycloalkyl, $C_1$-$C_6$-alkoxy, $C_2$-$C_6$alkanoyloxy and the like.

The term "$C_3$-$C_8$-cycloalkyl" is used to denote a cycloaliphatic hydrocarbon radical containing three to eight carbon atoms. The term "substituted $C_3$-$C_8$-cycloalkyl" is used to describe a $C_3$-$C_8$-cycloalkyl radical as detailed above containing at least one group selected from $C_1$-$C_6$-alkyl, $C_1$-$C_6$-alkoxy, hydroxy, carboxy, halogen, and the like.

The term "aryl" is used to denote an aromatic radical containing 6, 10 or 14 carbon atoms in the conjugated aromatic ring structure and these radicals are optionally substituted with one or more groups selected from $C_1$-$C_6$-alkyl; $C_1$-$C_6$-alkoxy; phenyl, and phenyl substituted with $C_1$-$C_6$-alkyl; $C_1$-$C_6$-alkoxy; $C_3$-$C_8$-cycloalkyl; halogen; hydroxy, carboxy, cyano, trifluoromethyl and the like. Typical aryl groups include phenyl, naphthyl, phenylnaphthyl, anthryl (anthracenyl) and the like. The term "heteroaryl" is used to describe conjugated cyclic radicals containing at least one hetero atom selected from sulfur, oxygen, nitrogen or a combination of these in combination with from two to about ten carbon atoms and these heteroaryl radicals substituted with the groups mentioned above as possible substituents on the aryl radical. Typical heteroaryl radicals include: 2- and 3-furyl, 2- and 3-thienyl, 2- and 3-pyrrolyl, 2-, 3-, and 4-pyridyl, benzothiophen-2-yl; benzothiazol-2-yl, benzoxazol-2-yl, benzimidazol-2-yl, 1,3,4-oxadiazol-2-yl, 1,3,4-thiadiazol-2-yl, 1,2,4-thiadiazol-5-yl, isothiazol-5-yl, imidazol-2-yl, quinolyl and the like.

The terms "$C_1$-$C_6$-alkoxy" and "$C_2$-$C_6$-alkanoyloxy" are used to represent the groups —O—$C_1$-$C_6$-alkyl and —OCO$C_1$-$C_6$-alkyl, respectively, wherein "$C_1$-$C_6$-alkyl" denotes a saturated hydrocarbon that contains 1-6 carbon atoms, which may be straight or branched-chain, and which may be further substituted with one or more groups selected from halogen, methoxy, ethoxy, phenyl, hydroxy, carboxy, acetyloxy and propionyloxy. The term "halogen" is used to represent fluorine, chlorine, bromine, and iodine; however, chlorine and bromine are preferred.

The term "$C_2$-$C_{22}$-alkylene" is used to denote a divalent hydrocarbon radical that contains from two to twenty-two carbons and which may be straight or branched chain and which may be substituted with one or more substituents selected from hydroxy, carboxy, halogen, $C_1$-$C_6$-alkoxy, $C_2$-$C_6$-alkanolyloxy and aryl. The term "$C_3$-$C_8$-cycloalkylene" is used to denote divalent cycloaliphatic radicals containing three to eight carbon atoms and these are optionally substituted with one or more $C_1$-$C_6$-alkyl groups. The term "arylene" is used to denote 1,2-, 1,3-, and 1,4-phenylene radicals and these optionally substituted with $C_1$-$C_6$-alkyl, $C_1$-$C_6$-alkoxy and halogen.

Preferred hindered amines contain alkyl-substituted piperidinyl moieties and/or triazine moieties, more preferably hindered amines where at least one amine group is substituted by both a triazine moiety and an alkyl-substituted piperidine moiety. In the most preferred hindered amines, amino group-containing moieties are linked by an alkylene group, preferably a (—$CH_2$—)$_n$ group where n is from 2 to 12, preferably from 4-10, and most preferably 6 or 8. The most preferred hindered amine is Cyasorb® UV-3529, containing repeat units of the formula:

(21)

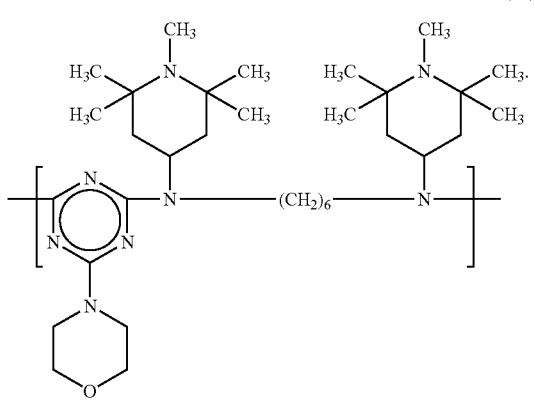

The salt of the amine component may be prepared by bringing together the acidic phosphorus-containing compound and the basic nitrogen-containing organic compound or ammonium hydroxide in a suitable manner. A suitable manner is any procedure that involves contacting the acidic phosphorus-containing acid with the basic organic compound or ammonium hydroxide. For example, the acidic phosphorus-containing compound and the basic nitrogen-containing organic compound or ammonium hydroxide may be dissolved in appropriate solvents, and the solutions mixed, followed by precipitation of the reaction product; mixing the phosphorus-containing acid and the basic organic compound or ammonium hydroxide without solvent; and the like.

The ratio of the number of acidic groups in the acidic phosphorus compound to the number of basic nitrogen atoms in the basic organic compound or ammonium hydroxide may be in the range of about 0.05 to about 2, preferably from about 0.25 to about 1.1. Compositions that contain a large excess of unreacted acidic phosphorus compounds may result in corrosion of process equipment during polyester manufacture, concentrate manufacture (if any) or preform manufacture.

Since the catalyst system used in the invention can be so easily at least partially deactivated, phosphorus compounds previously found to be less effective with antimony catalyzed systems, such as the full esters of acidic phosphorus compounds, like phosphate triesters, can now be used effectively in the polymer melt and process of the invention. Moreover, phosphorus compounds found to cause an increase in haze with antimony catalyzed systems, such as phosphorous acid, may be used as a deactivator with the catalyst system of the present invention without acting to increase the haze due to reduction to a metal, which, in the case of antimony catalyzed systems, imparts a gray or black color to the polyester.

The quantity of the phosphorus compound or other catalyst deactivator used in this process is effective to reduce the amount of AA generated upon melting the polymer particles, which are produced via a melt phase manufacturing process, by partially or fully deactivating the catalytic activity of the combination titanium catalysts or of said (i) aluminum atoms and (ii) alkaline earth metal atoms or alkali metal atoms or alkali compound residues. The amount of AA generated upon melting that can be tolerated depends on the end-use application and often on the particular beverage brand owner involved. Preforms used to make water bottles often have lower AA specifications than preforms used to make bottles for carbonated soft drinks (CSD). For example, the maximum acceptable level of AA in CSD preforms may be about 8 ppm, while the maximum acceptable level of AA in some water preforms may be about 3 ppm. Preforms intended for use in both CSD and water markets, dual-use preforms, often have AA specifications similar to preforms used solely in the water market. The quantity of phosphorus compound or other catalyst deactivator used depends on the target in the polyester, which depends on the end-use application and/or beverage brand owner involved. For example, the targeted phosphorus level in PET will be higher for water or dual-use applications than for CSD applications. Since late addition of catalyst deactivator can cause It.V. loss, the minimum amount of deactivator possible should be added to achieve the targeted AA level in the part for a given application. If the deactivator is corrosive, this is another reason to use the minimum amount of deactivator possible to achieve the targeted AA level in the part for a given application.

In the case where an aluminum compound and/or an alkali metal compound and/or alkali earth compound is used to catalyze polycondensation, consideration is taken for the cumulative amount of aluminum, alkali or alkaline earth metals, and any other catalyst metals present in the melt. The ratio of the moles of phosphorus to the total moles of aluminum and alkaline earth metal and/or alkali metal (P:M MR where M is deemed to be the sum of the moles of aluminum, the moles of alkaline earth metals, if present and the moles of alkali metals, if present, and where MR stands for mole ratio) is generally at least 0.1:1, or at least 0.3:1, or at least 0.5:1, or at least 0.7:1, or at least 1:1, and up to about 5:1, or more preferably up to about 3:1, or up to 2:1, or up to 1.8:1, or up to 1.5:1. Excessively large quantities of phosphorus compounds should be avoided to minimize the loss in polymer It.V. upon addition of the phosphorus compound to the polyester melt. In addition, in the case of aluminum and alkali metal catalysts, there is an optimum amount of phosphorus to obtain the lowest amount of M generated; therefore, excess phosphorus compound, especially if it is acidic, can increase the amount of AA generated. The preferred range for P:M MR is 0.5 to 1.5.

Compounds of metals other than aluminum, alkali metals and alkaline earth metals also react with phosphorus compounds. If, in addition to compounds of aluminum, alkali metals and/or alkaline earth metals, other metal compounds that react with phosphorus compounds are present, then the amount of phosphorus compound added late is desirably in excess of that required to achieve the targeted P:M MR to ensure that the phosphorus compounds react or combine with all reactive metals present. In another embodiment of the invention, the polyester polymer composition contains aluminum atoms within a range of 5 ppm to 100 ppm, or 7 to 60 ppm, or 8 ppm to 20 ppm, based on the weight of the polyester polymer, and the molar ratio of all alkaline earth metal and/or alkali metal atoms to the moles of aluminum atoms is within a range of 0.5:1 to 6:1, or 1:1 to 5:1, or 2:1 to 4:1, and the P:M ratio ranges from 0.1:1 to 3:1, or 0.3:1 to 2:1, or 0.5:1 to 1.5:1. Preferably, the polyester polymer composition contains aluminum and at least one of lithium or sodium or potassium or a combination of thereof. In one embodiment, the composition contains aluminum and lithium, or aluminum and sodium atoms.

In the case of a titanium polycondensation catalyst, wherein the catalyst deactivator comprises a phosphorus compound, in another embodiment of the invention, the deactivator is present in a P:Ti mole ratio (of P:Ti) of at least 0.015:1, or at least 0.7:1, or at least 1:1.

In another embodiment, a desirably range of titanium atoms is from about 2 to about 20 ppm based on the weight of the polyester, or from about 4 ppm to about 15 ppm, or from about 5 ppm to about 10 ppm.

Since one of the benefits of the invention is the ease with which the catalyst system may be deactivated, care should be taken not to add the phosphorus compound or another deactivator too early as this would retard the polycondensation rate. The addition of the final amount of desired phosphorus should be completed only upon substantial completion of polycondensation and thereafter, and preferably, the final amount of desired phosphorus compound should not be added to the polymer melt in the melt phase manufacturing process until substantial completion of the polycondensation or thereafter.

In the embodiments in which the phosphorus compounds are added in the melt phase polymerization, by the final amount of phosphorus is meant the final amount of phosphorus desired in the polyester polymer exiting the melt phase manufacturing process or as appearing in a pellet. If desired, a partial amount of phosphorus compound may be added early in the melt phase manufacturing process, such as at the initiation of polycondensation, provided that a portion of phosphorus representing the final amount is added late in the course of polycondensation or thereafter but before solidification as explained further below. To maximize polycondensation and/or production rates, the majority, or preferably the bulk, or most preferably the whole of the phosphorus compound is added late to the melt phase manufacturing process. For those skilled in the art, it is known that processes that involve ester exchange may require the addition of a phosphorus compound immediately following the ester exchange to deactivate the ester exchange catalyst. If the ester exchange catalyst is also providing as at least part of the catalysis in the polycondensation zone, the addition of phosphorus after ester exchange is omitted.

To minimize It.V. loss if large quantities of phosphorus are added, or to further minimize the potential It.V. loss even if moderate or optimal quantities of phosphorus are added, it is desirable to add the phosphorus compound neat, that is without further dilution, such as in the case of 85% or more phosphoric acid. If a carrier is used, it is preferred that that the carrier is nonreactive, that is, does not break the polymer chain nor increase AA generation rates. Water, alcohols, glycols and lower molecular weight PET are known to break the polymer chain. Once the minimum amount of the phosphorus compound and the associated It.V. loss are known, the melt-phase process can be carried out such that the It.V, made before deactivation/stabilization, is higher by the amount of It.V. loss expected so that the target It.V. can be achieved.

Once the desired It.V. is obtained in the finisher zone and catalyst deactivator is added late, the melt is generally processed to convert the molten PET into amorphous solid pellets. Typically, the weight of a single amorphous solid pellets would be in the range of 0.01 to 10 grams. A suitable It.V. from the melt phase can range from 0.5 dL/g to 1.2 dL/g. However, one advantage of the present process is that the solid stating step can optionally be avoided. Solid stating is commonly used for increasing the molecular weight (and the It.V.) of the pellets in the solid state, usually by at least 0.05 units, and more typically from 0.1 to 0.5 units.

The method and equipment for converting molten polymer exiting the melt phase reactors to pellets is not limited, and any conventional system used for making pellets is suitable in the practice of the invention. For example, strands of the polyester polymer melt are at least surface cooled to below the glass transition temperature of the polymer to form a cooled polyester polymer, followed by pelletizing the cooled polyester polymer to form solid amorphous pellets. These pellets may be optionally crystallized.

Alternatively, the molten polymer may be extruded through a die and about instantly cut into pellets before the polyester polymer cools below its glass transition temperature. These pellets may be optionally crystallized before the polymer cools below its glass transition temperature.

It should be noted that for some polyester polymers crystallization and/or "solid stating" may be very difficult. For example, PET comprising copolymerized cyclohexanedimethanol (CHDM) in the amounts of 15 or more weight percent of the diol component is amorphous or is low percentage crystalline (e.g. less than 1% crystalline or less than 5% crystalline or less than 10% crystalline). Therefore, in one embodiment of the invention, specifically in reference to solid polyester polymer particles, said particles are limited to those combinations of copolymerized materials (e.g. diacids and diols) that can be fairly readily crystallized, typically with a percentage crystallinity of at least 10% or at least 20%.

In a preferred embodiment, the subject process differs substantially from prior processes in that it is capable of producing a product of sufficiently high inherent viscosity directly in the melt phase, without involving any necessity for a subsequent solid state polymerization, usually termed "solid stating." Avoidance of solid stating also may even allow direct molding from the melt. These advantages are achieved through the use of at least one polycondensation catalyst in conjunction with catalyst deactivator, such as phosphoric acid or amine salts of phosphorus-containing acids, which are added late in the polycondensation stage. It has been surprisingly discovered that the present method can allow a reduced polycondensation time, creates a product of suitable inherent viscosity without solid stating, and produces a solid product exhibiting reduced residual acetaldehyde content in the solid polyester particles, reduced acetaldehyde generation upon melting and relatively high concentration of vinyl ends.

The solid particles produced in the melt phase process preferably have an acetaldehyde generation rate, when measured in an extrusion plastometer at 295° C. for 5 minutes, of 20 ppm or less, or 18 ppm or less, or 16 ppm or less, or 13 ppm or less, or 11 ppm or less, or 10 ppm or less, or 8 ppm or less. The process of the invention does not require melting the particles at 295° C. for 5 minutes to make molded articles. In the instance of measuring the acetaldehyde generation rate on preforms, it is sufficient to use the ASTM # F2013-00 method as described above without subjecting the preforms to a further melt history since by virtue of making a preform, the pellets are melted in an extruder prior to injection molding. When polyester particles are fed to an extruder, which is part of an injection molding machine, 20 oz. preforms made from the solid polyester particles of the invention have an AA level of 10 ppm or less, 8 ppm or less, 6 ppm or less, or 5 ppm or less, or 4 ppm or less under any manufacturing conditions, but for purposes of determining the level of AA generation, the level is determined at a barrel temperature of about 285° C. and a melt residence time of about 2 minutes.

The solid particles produced in the melt phase manufacturing process preferably have a vinyl ends concentration of 0.8 $\mu eq/g$ or more, or 1.0 $\mu eq/g$ or more, or 2.0 $\mu eq/g$ or more, or 3.0 $\mu eq/g$ or more, or 5 $\mu eq/g$ or more.

The particles of the invention are directly or indirectly packaged as a bulk into shipping containers, which are then shipped to customers or distributors. It is preferred to subject the crystallized particles to any process embodiment described herein without solid state polymerizing the particles at any point prior to packaging the particles into shipping containers. With the exception of solid state polymerization, the particles may be subjected to numerous additional processing steps in-between any of the expressed steps.

Shipping containers are containers used for shipping over land, sea or air. Examples include railcars, semi-tractor trailer containers, Gaylord boxes, ship hulls, or any other container which is used to transport finished polyester particles to a customer. Customers are typically converter entities who convert the particles into preforms or other molded articles.

The shipping containers contain a bulk of polyester polymer particles. A bulk occupies a volume of at least 3 cubic meters. In preferred embodiments, the bulk in the shipping container occupies a volume of at least 5 cubic meters, or at least 10 cubic meters. Typically, the weight of an individual finished polyester polymer particle would be in the range of 0.01 to 10 grams.

In one embodiment, there is provided finished polyester polymer particles having an average It.V. of at least 0.68 dL/g, or 0.70 dL/g, or 0.72 dL/g, or 0.74 dL/g, or 0.76 dL/g, or 0.80 dL/g, obtained in a melt phase polymerization and a residual acetaldehyde level of 10 ppm or less, or of 5 ppm or less; wherein said particles comprising an aluminum level in an amount of at least 3 ppm, or at least 5 ppm, or at least 8 ppm, or at least 11 ppm, or at least 15 ppm, based on the weight of the polymers. Preferably, the polyester particles in the shipping container also have a vinyl ends concentration of at least 0.8 µeq/g or more, or 1.0 µeq/g or more, or 2.0 µeq/g or more, or 3.0 µeq/g or more, or 5 µeq/g or more. Preferably, the polyester particles in the shipping container also have a degree of crystallinity of at least 20%, preferably at least 30%; and the particles also contain a nonzero level of an alkaline earth metal or alkali metal, along with a nonzero level of phosphorus. More preferably, the AA generation of such particles is less than 20 ppm, or less than 18 ppm, or less than 16 ppm, or less than 14 ppm, or less than 12 ppm, or less than 10 ppm, and the particles have an L* brightness of at least 55, or at least 60, or at least 65, at least 70, or at least 73, or at least 76, and lack AA scavengers. The particles are desirably contained in a shipping container. Most preferably, the particles have not been solid state polymerized. By "finished" particles, it is meant particles that have been subjected by the particle manufacturer to all the processing conditions needed to produce a particle ready for feeding into dryer hoppers associated with a molding machine or directly to a molding machine used for converting particles into articles, without any further processing steps performed by the particle manufacturer.

Molded products can be formed from the melt phase products by any conventional techniques known to those of skill. For example, melt phase products, optionally solid state polymerized, which are crystallized to a degree of crystallization of at least 10%, are fed to a machine for melt extruding and injection molding the melt into shapes such as preforms suitable for stretch blow molding into beverage or food containers, or a machine for injection molding, or a machine for merely extruding into other forms such as sheet. Suitable processes for forming the products are known and include extrusion, extrusion blow molding, melt casting, injection molding, a melt to mold process, stretch blow molding (SBM), thermoforming, and the like.

Examples of the kinds of molded products which can be formed from the melt phase products and the polyester polymer composition of the invention include sheet; film; packaging and containers such as preforms, bottles, jars, and trays; rods; tubes; lids; and filaments and fibers. Beverage bottles made from polyethylene terephthalate suitable for holding water or carbonated beverages, and heat-set beverage bottles suitable for holding beverages which are hot filled into the bottles are examples of the types of bottles which are made from the crystallized particles of the invention. Examples of trays are those which are dual ovenable and other CPET trays.

In another embodiment, the molded article preferably lacks an organic acetaldehyde scavenger. Preferably, ingredients added to the solid polyester particles at the melt processing step do not include organic acetaldehyde scavengers.

As described above, the catalyst deactivators are added late in the course of polycondensation or thereafter but before solidification. It is also possible to add a small amount of deactivator earlier in the melt-phase manufacturing process while adding the bulk of the deactivator late in the melt-phase manufacturing. In addition to the embodiment where the total amount of deactivator is added during the melt phase process for making the polyester polymer, in another embodiment, a portion of the total amount of deactivator is added to the polyester polymer in at least two stages, once in the melt phase process for making the polyester polymer and again at any point after the polyester polymer is solidified and before the article is formed from the polyester polymer, such as during melt processing the polyester polymer to make an article as conventionally done in an extruder or injection molding machine for making the article. In yet a further embodiment, the total amount of the deactivator is added after solidification and before making the article.

Partial or total addition of the phosphorus compound after solidification from a melt phase manufacturing process may be accomplished by either melt compounding the catalyst deactivator with the polyester polymer particles to form a solid concentrate of polyester polymer particles containing randomly dispersed catalyst deactivator compound(s), after which the concentrate is fed to the melt processing zone for making an article along with a feed stream of polyester particles; or a stream of catalyst deactivator compounds can be added directly as a neat stream, or in a slurry or dispersion made with a liquid carrier, together with a stream of the polyester polymer particles to the melt processing zone to make the articles. Thus, there is provided an embodiment in which crystalline polyester polymers are produced from a melt phase process without a catalyst deactivator added late, followed by blending the catalyst deactivator with the polyester polymer by a compounding extrusion or in the extruder portion of the injection molding process such as that used to melt blend solid, liquid, or molten ingredients into a stream of polyester polymer in an extruder, or that used to make a molded article by an extrusion in the injection molding process, or blending in any other mixing device.

In this embodiment, the mixing device where the catalyst deactivator is introduced may be part of the injection molding process, or it may be a separate step prior to injection molding. The catalyst deactivator may be introduced neat, in a liquid carrier or via a polymer concentrate. Introduction neat or in a liquid carrier is more preferred since reaction of the catalyst deactivator with the catalyst in the polymer carrier may lower effectiveness. If the catalyst deactivator is a liquid and is added neat or in a liquid carrier, a mixer at ambient conditions could be used to coat the pellets with the liquid additive prior to entry into an extruder. If the polymer concentrate route is used, the concentrate pellets could be dry blended at ambient conditions with the made exclusively in the melt-phase pellets to make a 'salt and pepper' type blend. These same comments and approaches also apply to melt blending the catalyst deactivator with solid-stated pellets.

This embodiment is particularly useful if the pellets are solid state polymerized. Incorporating the catalyst deactivator in the melt phase may in some instances lower the solid-stating rate. If one desires to solid state polymerize the polyester pellets, it is advantageous to add the catalyst deactivator after the pellets have undergone a solid state polymerization process.

This invention can be further illustrated by the additional examples of embodiments thereof, although it will be understood that these examples are included merely for purposes of illustration and are not intended to limit the scope of the invention.

EXAMPLES

The PET oligomer used as a starting material in Comparative Example 1 and Example 1 has about 94 to 96.5% conversion by proton NMR. The isophthalic acid concentration level is about 2.0 to 2.2 mole %. The diethylene glycol concentration level is about 4.6 to 4.8 mole %.

The fit between the stirrer and the flask can impact the finisher time required during torque terminated runs. A paddle stirrer is selected to have a typical fit with the flask being used. Prior to the run, toothpaste is put in the flask, which is then fitted with a paddle stirrer, polymer head, lipped Teflon tube and hose. The flask is inverted as the stirrer is pushed up and turned by hand. The clear areas on both sides of the center are measured. The width of the clear areas should total between 1.7 and 2.7 cm. The flask is rinsed out with water and acetone prior to use.

For polycondensation, the ground oligomer (103 g) is weighed into a half-liter, single-necked, round-bottomed flask selected per the preceding paragraph. The catalyst solution or mixture is added to the flask. The flask is fitted with a 316 L stainless steel paddle stirrer selected per the preceding paragraph and a glass polymer head fitted with lipped Teflon tube and hose. After attaching the polymer head to a side arm and a purge hose, two nitrogen purges to 0.5 torr are completed.

Polymer disks made in the lab are cooled from the outside (where the polymer meets the flask) to the inside (where the polymer meets the stirrer rod; the deepest part of disk is in the center where the stirrer rod is located). While polymer disks made in the lab are cooling, some AA generation may occur. In an industrial manufacturing production environment, molten strands or melt globules that become particles or pellets are much thinner and cool much more quickly than relatively large disks or are actively quenched. The percentage reduction in free AA is still of interest as a relative point of comparison as all the samples in an example have about the same cooling time.

Comparative Example 1

The oligomer and procedure used are described in the preceding paragraphs of the Examples section. A 0.94 wt./wt. % Sb solution is made from antimony triacetate in ethylene glycol.

Aluminum isopropoxide, lithium hydroxide and ethylene glycol are heated up to 125° C. in an open bottle, which is fitted with a nitrogen purge, a magnetic stir bar and a thermocouple. The mixture is heated for about 3.5 h once 125° C. is achieved. The target Al level is 0.3 wt. %, and the target Li:Al mole ratio is 1, 3 or 5. Per ICP-OES the mixture with the Li:Al mole ratio of 1 has 0.33 wt. % Al and 0.084 wt. % Li. Per ICP-OES, the mixture with the Li:Al mole ratio of 3 has 0.33 wt. % Al and 0.28 wt. % Li. Per ICP-OES, the mixture with the Li:Al mole ratio of 5, which is heated for about 3 hours, has 0.38 wt. % Al and 0.45 wt. % Li.

The polymerization reactor is operated under control of a CAMILE™ automation system, programmed to implement the following experimental array. For the Sb controls, the stage 5-12 temperatures are 280° C. For the experimental runs, the temperature listed in Table 8 is the one used in the array for stages 5-12. The aluminum target is 10 or 25 or 40 ppm. The target Li:Al mole ratio is 1, 3 or 5.

| Stage | Time (min) | Temp (° C.) | Vacuum (torr) | Stirring (rpm) |
|---|---|---|---|---|
| 1 | 0.1 | 265 | 730 | 0 |
| 2 | 10 | 265 | 730 | 150* |
| 3 | 2 | 265 | 330* | 300* |
| 4 | 1 | 265 | 330 | 300 |
| 5 | 50 | 285* | 30* | 300 |
| 6 | 2 | 285 | 30 | 300 |
| 7 | 1 | 285 | 30 | 200* |
| 8 | 20 | 285 | 30 | 200 |
| 9 | 2 | 285 | 4* | 200 |
| 10 | 60 | 285 | 4 | 200 |
| 11 | 2 | 285 | 0.5* | 30* |
| 12 | 500# | 285 | 0.5 | 30 |

*= ramp; # = torque termination

The stirring system is automatically calibrated on torque between stages 4 and 5. The finisher stage (#12) is terminated when the stirrer torque target is met or exceeded on three separate occasions. No phosphorus compound is added to any of the runs in the example.

TABLE 1

| Sample | Temp. (deg C.) | Finisher Time (min) | Ave ICP Al (ppm) | Ave ICP Li (ppm) | Ave ICP Li:Al MR | IhV (dL/g) | ItV (dL/g) |
|---|---|---|---|---|---|---|---|
| 184 | 275 | 278.24 | 11.8 | 2.65 | 0.87 | 0.847 | 0.899 |
| 185 | 285 | 182.83 | 11.7 | 2.65 | 0.88 | 0.88 | 0.936 |
| 196 | 285 | 170.02 | 11.35 | 2.55 | 0.87 | 0.882 | 0.939 |
| 199* | 275 | 167.72 | 37.1 | 9.9 | 1.04 | 0.897 | 0.956 |
| 5 | 285 | 73.02 | 39.25 | 9.8 | 0.97 | 0.879 | 0.935 |

*The ICP data reported on - 199 is a single measurement.

| Sample | Ave ICP Al (ppm) | Ave ICP Li:Al MR | VEG (µeq/g) | AA GEN 295/5 (ppm) |
|---|---|---|---|---|
| 184 | 11.8 | 0.87 | 1.1 | 18.12 |
| 185 | 11.7 | 0.88 | 2.3 | 22.11 |
| 196 | 11.35 | 0.87 | 2.1 | 21.89 |
| 199 | 37.1 | 1.04 | 0.2 | 26.14 |
| 5 | 39.25 | 0.97 | 0.2 | 25.04 |

In the absence of a catalyst deactivator, relatively low levels of Al combined with relatively low Li:Al mole ratios result in vinyl end group concentrations of 0.8 µeq/g or higher and AA generation at 295° C. for 5 min (AA Gen 295/5) that is less than or equal to 22 ppm or very close to it. For example, see Samples 184, 185 and 196 in Table 1. At the higher polycondensation temperature of 285° C. (Samples 185 &

196), the vinyl end groups (VEG) are higher and so is the AA generation; however, the vinyl ends increase more percentagewise than the AA generation. In the three cases (Samples 184, 185 and 196), it can be theorized that the low level of Al and the low Li:Al mole ratio does not impart sufficient catalytic activity to convert most of the vinyl ends to AA; however, the theory is nonbinding. For other samples without a catalyst deactivator (Samples 199 & 5), there are higher Al and Li levels, which might result in sufficient catalytic activity to convert more of the VEG to AA; therefore, the VEG numbers are lower than 0.8 μeq/g, and the AA Gen 295/5 numbers are higher than 22 ppm. The shorter finisher times support the increased catalytic activity of samples made with higher Al & Li levels. For polymers heated to 275° C., the sample made with higher Al & Li levels (Sample 199) has a finisher time that is about 111 minutes shorter than that of the sample made with lower Al & Li levels (Sample 184). For polymers made at 285° C., the sample made with higher Al & Li levels (Sample 5) has a finisher time that is about 103 minutes shorter on average than that of the samples made with lower Al & Li levels (Sample 185 & 196).

Example 1

The oligomer and procedure used are described at the beginning of the Examples section. The antimony solution and the lithium/aluminum mixtures used are described in Comparative Example 1. The aluminum target is 10 or 25 or 40 ppm. The target Li:Al mole ratio is 1, 3 or 5. The phosphorus to metals mole ratio (P:M MR) target is 0, 0.5 or 1, where the moles of metals in the denominator are the sum of the Li moles plus the Al moles.

Where the P:M MR is not equal to zero in Table 2, 85% phosphoric acid is added in Stage 14 of the following polymerization array. Depending on the phosphorus target, 85% phosphoric acid is added without dilution for higher targets or as a 50:50 or 1:1 solution of 85% phosphoric acid and Millipore water for lower targets. An exception is Sample 12 where a 75:25 phosphoric acid (85%): Millipore water solution is used.

The polymerization reactor is operated under control of a CAMILE™ automation system, programmed to implement the following array. The temperature listed in Table 2 is the one used in stages 5 to 16 of the array. The finisher times used in stage 12 are based on finisher times determined in an analogous manner to those shown in Comparative Example 1.

| Stage | Time (min) | Temp (° C.) | Vacuum (torr) | Stirring (rpm) |
|---|---|---|---|---|
| 1 | 0.1 | 265 | 730 | 0 |
| 2 | 10 | 265 | 730 | 150* |
| 3 | 2 | 265 | 330* | 300* |
| 4 | 1 | 265 | 330 | 300 |
| 5 | 50 | 285* | 30* | 300 |
| 6 | 2 | 285 | 30 | 300 |
| 7 | 1 | 285 | 30 | 200* |
| 8 | 20 | 285 | 30 | 200 |
| 9 | 2 | 285 | 4* | 200 |
| 10 | 60 | 285 | 4 | 200 |
| 11 | 2 | 285 | 0.5* | 30* |
| 12 | Variable | 285 | 0.5 | 30 |
| 13 | 3 | 285 | 650* | 30 |
| 14 | 2 | 285 | 650 | 30 |
| 15 | 1 | 285 | 0.5* | 45* |
| 16 | 5 | 285 | 0.5 | 45 |

*= ramp

The stirring system is automatically calibrated on torque between stages 4 and 5. Calibrating on torque means that the background torque, that is the torque before the polymer starts to build appreciably, is determined and subtracted out of the measured torque as the polymer increases in molecular weight.

TABLE 2

| Sample | Li:Al Mole Ratio | Temp. (deg C.) | P:M Mole Ratio | Finisher Time (min) | ICP Al (ppm) | ICP Li (ppm) | ICP Li:Al MR | ICP P (ppm) | ICP P:M MR |
|---|---|---|---|---|---|---|---|---|---|
| 21 | 1 | 275 | 0 | 274 | 9.2 | 2.4 | 1.01 | 0 | 0.0 |
| 71 | 1 | 275 | 1 | 274 | 10.6 | 2.5 | 0.92 | 21.1 | 0.9 |
| 10 | 1 | 285 | 0 | 174 | 9.6 | 2.5 | 1.01 | 3.4 | 0.2 |
| 39 | 1 | 285 | 1 | 174 | 10.8 | 2.5 | 0.9 | 12.9 | 0.5 |
| 49 | 3 | 280 | 0.5 | 182 | 9 | 8 | 3.46 | 26.7 | 0.6 |
| 50 | 5 | 275 | 0 | 189 | 10.9 | 11.4 | 4.07 | 2 | 0.0 |
| 72 | 5 | 275 | 1 | 189 | 13.4 | 11.9 | 3.45 | 55.4 | 0.8 |
| 25 | 5 | 285 | 0 | 90 | 11.4 | 11.1 | 3.78 | 1.9 | 0.0 |
| 67 | 5 | 285 | 1 | 90 | 9.5 | 11.1 | 4.54 | 62.4 | 1.0 |
| 66 | 1 | 280 | 0.5 | 143 | 26.3 | 6 | 0.89 | 29.8 | 0.5 |
| 26 | 3 | 280 | 0 | 114 | 21.2 | 17.2 | 3.15 | 1.8 | 0.0 |
| 1 | 3 | 280 | 0.5 | 114 | 23.2 | 19.3 | 3.23 | 50.2 | 0.4 |
| 2 | 3 | 280 | 0.5 | 114 | 24.6 | 19.6 | 3.1 | 61.6 | 0.5 |
| 3 | 3 | 280 | 0.5 | 114 | 24.8 | 19.5 | 3.06 | 59.5 | 0.5 |
| 27 | 3 | 280 | 0.5 | 114 | 24.7 | 18.5 | 2.91 | 46.3 | 0.4 |
| 28 | 3 | 280 | 0.5 | 114 | 22 | 17.7 | 3.13 | 44.7 | 0.4 |
| 29 | 3 | 280 | 0.5 | 114 | 22.8 | 18.3 | 3.12 | 55.3 | 0.5 |
| 57 | 3 | 280 | 0.5 | 114 | 23 | 18.3 | 3.09 | 43.7 | 0.4 |
| 58 | 3 | 280 | 0.5 | 114 | 22.8 | 18.9 | 3.22 | 51.3 | 0.5 |
| 59 | 3 | 280 | 0.5 | 114 | 24.5 | 18.5 | 2.94 | 54.4 | 0.5 |
| 73 | 3 | 285 | 0.5 | 64 | 24 | 18.6 | 3.01 | 47.6 | 0.4 |
| 69 | 5 | 280 | 0.5 | 84 | 25 | 28.4 | 4.42 | 85.4 | 0.5 |
| 20 | 1 | 275 | 0 | 163 | 36.7 | 9.2 | 0.97 | 0 | 0.0 |
| 48 | 1 | 285 | 0 | 63 | 37.6 | 9.7 | 1 | 2 | 0.0 |
| 47 | 1 | 285 | 1 | 63 | 40.4 | 9.95 | 0.96 | 123.4 | 1.3 |
| 76 | 1 | 285 | 1 | 63 | 37.8 | 9.9 | 1.02 | 99.4 | 1.1 |
| 51 | 5 | 275 | 0 | 129 | 35.3 | 44.8 | 4.93 | 2 | 0.0 |
| 56 | 5 | 285 | 0 | 29 | 37.7 | 45.7 | 4.71 | 2 | 0.0 |
| 77 | 5 | 285 | 1 | 29 | 36.8 | 42.85 | 4.53 | 299.4 | 1.3 |
| 6 | | 280 | | 100 | | | | | |

TABLE 2-continued

| Sample | | Temp | % |
|---|---|---|---|
| 7 | | 280 | 100 |
| 8 | | 280 | 100 |
| 31 | | 280 | 100 |
| 32 | | 280 | 100 |
| 33 | | 280 | 100 |
| 60 | | 280 | 100 |
| 61 | | 280 | 100 |
| 64 | | 280 | 100 |

| Sample | ICP Al (ppm) | ICP Li (ppm) | ICP P (ppm) | Temp. (deg C.) | XRF Sb (ppm) | XRF P (ppm) | IhV (dL/g) | ItV (dL/g) |
|---|---|---|---|---|---|---|---|---|
| 21 | 9.2 | 2.4 | 0 | 275 | | | 0.784 | 0.828 |
| 71 | 10.6 | 2.5 | 21.1 | 275 | | | 0.775 | 0.818 |
| 10 | 9.6 | 2.5 | 3.4 | 285 | | | 0.86 | 0.914 |
| 39 | 10.8 | 2.5 | 12.9 | 285 | | | 0.823 | 0.872 |
| 49 | 9 | 8 | 26.7 | 280 | | | 0.895 | 0.953 |
| 50 | 10.9 | 11.4 | 2 | 275 | | | 0.876 | 0.932 |
| 72 | 13.4 | 11.9 | 55.4 | 275 | | | 0.781 | 0.825 |
| 25 | 11.4 | 11.1 | 1.9 | 285 | | | 0.87 | 0.925 |
| 67 | 9.5 | 11.1 | 62.4 | 285 | | | 0.775 | 0.818 |
| 66 | 26.3 | 6 | 29.8 | 280 | | | 0.843 | 0.894 |
| 26 | 21.2 | 17.2 | 1.8 | 280 | | | 0.889 | 0.947 |
| 1 | 23.2 | 19.3 | 50.2 | 280 | | | 0.869 | 0.924 |
| 2 | 24.6 | 19.6 | 61.6 | 280 | | | 0.824 | 0.873 |
| 3 | 24.8 | 19.5 | 59.5 | 280 | | | 0.83 | 0.88 |
| 27 | 24.7 | 18.5 | 46.3 | 280 | | | 0.813 | 0.861 |
| 28 | 22 | 17.7 | 44.7 | 280 | | | 0.813 | 0.861 |
| 29 | 22.8 | 18.3 | 55.3 | 280 | | | 0.82 | 0.868 |
| 57 | 23 | 18.3 | 43.7 | 280 | | | 0.812 | 0.859 |
| 58 | 22.8 | 18.9 | 51.3 | 280 | | | 0.841 | 0.892 |
| 59 | 24.5 | 18.5 | 54.4 | 280 | | | 0.818 | 0.866 |
| 73 | 24 | 18.6 | 47.6 | 285 | | | 0.822 | 0.871 |
| 69 | 25 | 28.4 | 85.4 | 280 | | | 0.773 | 0.816 |
| 20 | 36.7 | 9.2 | 0 | 275 | | | 0.855 | 0.908 |
| 48 | 37.6 | 9.7 | 2 | 285 | | | 0.835 | 0.885 |
| 47 | 40.4 | 9.95 | 123.4 | 285 | | | 0.714 | 0.75 |
| 76 | 37.8 | 9.9 | 99.4 | 285 | | | 0.723 | 0.76 |
| 51 | 35.3 | 44.8 | 2 | 275 | | | 0.89 | 0.948 |
| 56 | 37.7 | 45.7 | 2 | 285 | | | 0.804 | 0.85 |
| 77 | 36.8 | 42.85 | 299.4 | 285 | | | 0.658 | 0.688 |
| 6 | | | | 280 | 238.6 | 74.5 | 0.728 | 0.766 |
| 7 | | | | 280 | 242.1 | 72.1 | 0.746 | 0.786 |
| 8 | | | | 280 | 226.4 | 65.8 | 0.763 | 0.804 |
| 31 | | | | 280 | 229.8 | 92.8 | 0.708 | 0.743 |
| 32 | | | | 280 | 238 | 57.2 | 0.769 | 0.811 |
| 33 | | | | 280 | 234.9 | 65.3 | 0.764 | 0.806 |
| 60 | | | | 280 | 241.8 | 110.4 | 0.758 | 0.799 |
| 61 | | | | 280 | 245.9 | 119.2 | 0.792 | 0.837 |
| 64 | | | | 280 | 245.3 | 104.2 | 0.776 | 0.819 |

| Sample | ICP Al (ppm) | Li:Al Mole Ratio | ICP Li (ppm) | Temp. (deg C.) | P:M Mole Ratio | ICP P (ppm) | % Cryst. |
|---|---|---|---|---|---|---|---|
| 21 | 9.2 | 1 | 2.4 | 275 | 0 | 0 | 39.6 |
| 71 | 10.6 | 1 | 2.5 | 275 | 1 | 21.1 | 37.1 |
| 10 | 9.6 | 1 | 2.5 | 285 | 0 | 3.4 | 34.4 |
| 39 | 10.8 | 1 | 2.5 | 285 | 1 | 12.9 | 34.8 |
| 49 | 9 | 3 | 8 | 280 | 0.5 | 26.7 | 34.3 |
| 50 | 10.9 | 5 | 11.4 | 275 | 0 | 2 | 32.7 |
| 72 | 13.4 | 5 | 11.9 | 275 | 1 | 55.4 | 33.9 |
| 25 | 11.4 | 5 | 11.1 | 285 | 0 | 1.9 | 39.3 |
| 67 | 9.5 | 5 | 11.1 | 285 | 1 | 62.4 | 38.9 |
| 66 | 26.3 | 1 | 6 | 280 | 0.5 | 29.8 | 36.5 |
| 26 | 21.2 | 3 | 17.2 | 280 | 0 | 1.8 | 50.4 |
| 1 | 23.2 | 3 | 19.3 | 280 | 0.5 | 50.2 | 38 |
| 2 | 24.6 | 3 | 19.6 | 280 | 0.5 | 61.6 | 35.2 |
| 3 | 24.8 | 3 | 19.5 | 280 | 0.5 | 59.5 | 35.1 |
| 27 | 24.7 | 3 | 18.5 | 280 | 0.5 | 46.3 | 40.4 |
| 28 | 22 | 3 | 17.7 | 280 | 0.5 | 44.7 | 41.9 |
| 29 | 22.8 | 3 | 18.3 | 280 | 0.5 | 55.3 | 32.6 |
| 57 | 23 | 3 | 18.3 | 280 | 0.5 | 43.7 | 30.9 |
| 58 | 22.8 | 3 | 18.9 | 280 | 0.5 | 51.3 | 41.9 |
| 59 | 24.5 | 3 | 18.5 | 280 | 0.5 | 54.4 | 40.3 |
| 73 | 24 | 3 | 18.6 | 285 | 0.5 | 47.6 | 36.3 |
| 69 | 25 | 5 | 28.4 | 280 | 0.5 | 85.4 | 37.1 |
| 20 | 36.7 | 1 | 9.2 | 275 | 0 | 0 | 30.8 |
| 48 | 37.6 | 1 | 9.7 | 285 | 0 | 2 | 36.4 |
| 47 | 40.4 | 1 | 9.95 | 285 | 1 | 123.4 | 39.4 |
| 76 | 37.8 | 1 | 9.9 | 285 | 1 | 99.4 | 49.2 |

TABLE 2-continued

| | | | | | | | |
|---|---|---|---|---|---|---|---|
| 51 | 35.3 | 5 | 44.8 | 275 | 0 | 2 | 38.8 |
| 56 | 37.7 | 5 | 45.7 | 285 | 0 | 2 | 39.2 |
| 77 | 36.8 | 5 | 42.85 | 285 | 1 | 299.4 | 36.8 |
| 6 | | | | 280 | | | 40.4 |
| 7 | | | | 280 | | | 38.3 |
| 8 | | | | 280 | | | 39.6 |
| 31 | | | | 280 | | | 37.3 |
| 32 | | | | 280 | | | 38.2 |
| 33 | | | | 280 | | | 37.3 |
| 60 | | | | 280 | | | 39.6 |
| 61 | | | | 280 | | | 41.3 |
| 64 | | | | 280 | | | 37.2 |

| Sample | ICP Al (ppm) | ICP Li (ppm) | ICP P (ppm) | Temp. (deg C.) | Residual AA (ppm) | AA GEN 295/5 (ppm) | AA Gen 275/10 (ppm) | VEG (μeq/g) |
|---|---|---|---|---|---|---|---|---|
| 21 | 9.2 | 2.4 | 0 | 275 | 21.0 | 18.5 | 15.4 | 0.5 |
| 71 | 10.6 | 2.5 | 21.1 | 275 | 11.8 | 9.4 | 7.3 | 1.4 |
| 10 | 9.6 | 2.5 | 3.4 | 285 | 37.7 | 22.7 | 22.9 | 1.4 |
| 39 | 10.8 | 2.5 | 12.9 | 285 | 18.1 | 12.7 | 10.5 | 2.9 |
| 49 | 9 | 8 | 26.7 | 280 | 17.6 | 8.7 | 6.0 | 0.7 |
| 50 | 10.9 | 11.4 | 2 | 275 | 25.6 | 22.1 | 16.9 | 0.2 |
| 72 | 13.4 | 11.9 | 55.4 | 275 | 11.0 | 10.0 | 6.6 | 0.7 |
| 25 | 11.4 | 11.1 | 1.9 | 285 | 38.0 | 22.9 | 20.0 | 0.3 |
| 67 | 9.5 | 11.1 | 62.4 | 285 | 21.8 | 12.7 | 9.8 | 1.4 |
| 66 | 26.3 | 6 | 29.8 | 280 | 17.0 | 9.5 | 6.0 | 1.4 |
| 26 | 21.2 | 17.2 | 1.8 | 280 | 35.9 | 25.6 | 17.5 | 0.2 |
| 1 | 23.2 | 19.3 | 50.2 | 280 | 4.9 | 9.8 | 6.7 | 0.6 |
| 2 | 24.6 | 19.6 | 61.6 | 280 | 4.1 | 8.1 | 6.1 | 0.9 |
| 3 | 24.8 | 19.5 | 59.5 | 280 | 4.1 | 9.7 | 5.7 | 0.9 |
| 27 | 24.7 | 18.5 | 46.3 | 280 | 12.8 | 9.7 | 7.2 | 0.4 |
| 28 | 22 | 17.7 | 44.7 | 280 | 15.1 | 9.3 | 7.4 | 0.4 |
| 29 | 22.8 | 18.3 | 55.3 | 280 | 16.5 | 9.0 | 9.6 | 0.4 |
| 57 | 23 | 18.3 | 43.7 | 280 | 15.4 | 10.5 | 8.2 | 0.4 |
| 58 | 22.8 | 18.9 | 51.3 | 280 | 16.6 | 8.7 | 5.8 | 0.8 |
| 59 | 24.5 | 18.5 | 54.4 | 280 | 12.8 | 8.5 | 7.9 | 0.9 |
| 73 | 24 | 18.6 | 47.6 | 285 | 22.9 | 10.3 | 7.3 | 1 |
| 69 | 25 | 28.4 | 85.4 | 280 | 21.7 | 9.4 | 6.2 | 0.7 |
| 20 | 36.7 | 9.2 | 0 | 275 | 24.0 | 23.0 | 18.9 | 0.2 |
| 48 | 37.6 | 9.7 | 2 | 285 | 44.7 | 27.6 | 21.0 | 0.2 |
| 47 | 40.4 | 9.95 | 123.4 | 285 | 35.5 | 21.7 | 20.6 | 0.8 |
| 76 | 37.8 | 9.9 | 99.4 | 285 | 30.7 | 17.5 | 15.8 | 1.1 |
| 51 | 35.3 | 44.8 | 2 | 275 | 26.2 | 34.2 | 22.6 | 0.2 |
| 56 | 37.7 | 45.7 | 2 | 285 | 65.4 | 41.0 | 25.7 | 0.2 |
| 77 | 36.8 | 42.85 | 299.4 | 285 | 41.6 | 18.6 | 13.8 | 1.4 |
| 6 | | | | 280 | 22.9 | 31.7 | | 0.9 |
| 7 | | | | 280 | 30.1 | 33.4 | 25.0 | 1 |
| 8 | | | | 280 | 29.4 | 33.3 | 23.6 | 1.1 |
| 31 | | | | 280 | 28.2 | 28.2 | 20.8 | 1.2 |
| 32 | | | | 280 | 34.2 | 34.1 | 26.9 | 0.7 |
| 33 | | | | 280 | 36.6 | 34.9 | 18.2 | 0.5 |
| 60 | | | | 280 | 25.6 | 31.0 | 22.5 | 1.2 |
| 61 | | | | 280 | 33.6 | 33.7 | 15.9 | 1 |
| 64 | | | | 280 | 31.3 | 34.4 | 22.2 | 1 |

| Sample | Residul AA (ppm) | AA GEN 295/5 (ppm) | AA Gen 275/10 (ppm) |
|---|---|---|---|
| CB-12 | 0.8 | 17.6 | 14.7 |
| CB-12 | 0.7 | 16.9 | 14.7 |
| CB-12 | 0.7 | 16.0 | 14.2 |
| CB-12 | 0.9 | 18.2 | 19.3 |
| CB-12 | 0.8 | 16.5 | 14.2 |
| CB-12 | | | 14.8 |
| CB-12 | | | 14.7 |
| CB-12 | 0.8 | 17.3 | 14.9 |
| CB-12 | | 18.8 | 16.0 |

Commercial polyester available from Eastman Chemical Company as CB-12 is submitted when the AA generation test is done on experimental samples.

Samples 21, 10, 50, 25, 26, 20, 48, 51 and 56 have no deactivator added late. Low vinyl end levels (0.2-0.3 μeq/g) are seen for all these samples, except −21 and −10. No deactivator means catalyst that is both active for polycondensation and the conversion of vinyl end groups (VEG) to acetaldehyde (AA). Low levels of VEG in this situation indicate that the catalyst has converted most of the VEG to AA. Without being bound by any theory, more VEG are created and available for conversion to AA as the polycondensation temperature increases under comparable circumstances. Again without being bound by any theory, more catalyst, in the form of higher aluminum levels and higher Li:Al mole ratios (MR) increases the conversion of VEG to AA. Sample 56 has an Al target of 40 ppm and a Li:Al MR of 5, and a polycondensation temperature of 285° C.; therefore, it is expected that the AA generation after melt processing at 295° C. for 5 min in an extrusion plastometer is the highest seen for the Li/Al-catalyzed polymers. Sample 51 has an Al target of 40 ppm and a Li:Al MR of 5, and a polycondensation temperature of 275° C.; therefore, it is expected that the AA generation is the second highest seen for the Li/Al-catalyzed polymers. The next highest AA is seen for Sample 48 when the polycondensation temperature is 285° C. and the Al target stays at 40 ppm but the Li:Al MR is lowered to 1 (that is, the Li level drops from ~45 ppm to ~10 ppm).

The lowest AA generation with no deactivator added is seen for Sample 21, which is at the lowest polycondensation temperature (275° C.), the lowest Al target (10 ppm), and the lowest Li:Al MR (1). The VEG are starting to accumulate (0.5 µeq/g) due to the low levels of catalyst (9.2 ppm Al & 2.4 ppm Li by ICP), and the AA generation is falling as fewer VEG are converted to AA. Presumably, the low catalytic activity for VEG conversion to AA is supported by the low polycondensation rate or long finisher time (274 min or ~4.5 hours). Sample 10 also has the lowest Al target (10 ppm), and the lowest Li:Al MR (1); however, it has a higher polycondensation temperature (285° C.). More VEG are made at the higher temperature, and the low catalyst levels do not result in as much conversion to AA; therefore, the VEG levels greatly increases (1.4 µeq/g) with only somewhat higher AA generation (22.7 ppm).

Samples 39 and 67 are examples of lithium aluminum catalyzed PET with deactivator added late that have low AA generation levels (<15 ppm AA on the Ceast extrusion plastometer after 5 min at 295° C.) and high concentrations of vinyl end groups (>1 µeq/g). Although the high polycondensation temperature and lower catalyst loadings are similar to Sample 10, the VEG are even higher in Sample 39 due to the presence of the deactivator, which further lowers the activity of the catalyst for the conversion of VEG to AA and hence, the VEG build up more (2.9 µeq/g). Sample 67 is similar to 39 in terms of Al level and polycondensation temperature; however, the Li:Al MR is much higher. The additional Li present results in a much shorter finisher time for 67 as compared to 39. A shorter finisher time results in a faster production rate and hence, more pounds of polymer per unit time.

Samples 71 and 66 are examples of lithium aluminum catalyzed PET with deactivator added late that have very low AA generation levels (<10 ppm AA on the Ceast extrusion plastometer after 5 min at 295° C.) and high concentrations of vinyl end groups (>1 µeq/g). Although both samples have a Li:Al MR of 1, Sample 66 has a much shorter finisher time than 71, because it has ~26 ppm Al instead of ~10 ppm and a polycondensation temperature of 280° C. instead of 275° C.

There were nine runs performed with the identical targets: Al (~24 ppm), Li:Al mole ratio of 3 (~19 ppm Li), a polycondensation temperature of 280° C., and a phosphorus to metals (Li+Al) mole ratio of 0.5. All nine runs had very low amount of AA generated (8.1 to 10.5 ppm) after processing in an extrusion plastometer at 295° C. for 5 minutes. Four of these runs also had vinyl end groups (VEG) at or above 0.8 µeq/g: Samples 2, 3, 58 & 59. One run (Sample 1) had VEG of 0.6 µeq/g. With the standard deviation of the VEG test being 0.11 µeq/g at the 0.76 µeq/g level, the 95% confidence interval around a single test is 0.8±0.22 µeq/g or 0.58 to 1.02 µeq/g. With test variability, Sample 1 may have VEG of 0.8 µeq/g. Samples 27, 28, 29 & 57 have VEG of 0.4 µeq/g. There is also some variability in the sample preparation. A combination of variability in the sample preparation and in the VEG test may explain these low VEG numbers.

Samples 49, 72 and 69 are illustrative of lithium aluminum catalyzed PET with deactivator added late that have very low AA generation levels (10 ppm AA or less on the Ceast extrusion plastometer after 5 min at 295° C.) and 0.7 µeq/g of vinyl end groups. With test variability, these samples may have VEG of 0.8 µeq/g or more.

Sample 77 is illustrative of lithium aluminum catalyzed PET with deactivator added late that has a moderate AA generation level (>15 ppm and <22 ppm AA on the Ceast extrusion plastometer after 5 min at 295° C.) and higher concentrations of vinyl end groups (>1.0 µeq/g). Made with the same catalyst targets and same conditions, PET without deactivator (Sample 56) had high AA Gen (41 ppm) and low VEG (0.2 µeq/g). Adding the deactivator late decreased the AA Gen by about 55% and increased the VEG by 7 times.

For the specific PET samples tested, there is an optimum P:M MR. In the laboratory where these samples were made, the optimum is between P:M MR of about 0.5 to about 0.8, with the flattest area being generally between about 0.6 and 0.7. Since the P:M MR of 1 was used for Sample 77, the AA generation rate may decrease further if a P:M MR closer to the optimum level is used. The optimum P:M MR may also depend on the catalyst deactivator addition method inter alia. A slip stream approach, making an in situ concentrate, may have a higher P:M MR optimum than the more direct addition approach used here.

Comparative Example 2

A sample of PET oligomer prepared from terephthalic acid and ethylene glycol, and also containing about 1.5 mole percent of about 35% cis/65% trans 1,4-cyclohexanedimethanol was employed in the polycondensation. The oligomer also contains about 1.2 weight percent of diethylene glycol, which was generated during esterification. This oligomer has about 95% conversion of acid groups via NMR/titration of acid groups, a $M_n$ of about 766 g/mole, and a Mw of 1478 g/mole.

Prior to undergoing polycondensation, ground oligomer (103 g) is weighed into a half-liter, single-necked, round-bottomed flask. The catalyst employed is titanium tetrabutoxide and it is added to the flask. A 316 L stainless steel paddle stirrer and glass polymer head were attached to the flask. After attaching the polymer head to a side arm and a purge hose, two nitrogen purges are completed. The polymerization reactor is operated under control of a CAMILE™ automation system, programmed to implement the following array.

| Stage | Time (minutes) | Temperature °C. | Vacuum (torr) | Stir Speed (rpm) | Power (kg-cm) | Flags |
|---|---|---|---|---|---|---|
| 1 | 0.1 | 270 | 730 | 0 | | |
| 2 | 10 | 270 | 730 | 150* | | |
| 3 | 2 | 270 | 140* | 300* | | |
| 4 | 1 | 270 | 140 | 300 | | Calibrate |
| 5 | 10 | 270 | 25* | 300 | | |
| 6 | 10 | 270 | 25 | 300 | | |
| 7 | 1 | 270 | 140* | 300 | | |
| 8 | 2 | 270 | 140 | 300 | | Catalyst (P) |
| 9 | 1 | 270 | 25* | 300 | | |
| 10 | 10 | 270 | 25 | 300 | | |
| 11 | 2 | 270 | 2* | 30* | | |
| 12 | 1 | 270 | 0.2* | 30 | | Vacuum |
| 13 | 500# | 270 | 0.2 | 30 | target | Power |

*= ramp;
= torque termination
when temperature = 300° C., change all 270 to 300 (same for 285).
when vacuum = 2 torr, change all 0.2 to 2 (same for 1.1 torr).

A molten bath of Belmont metal is raised to surround the flask, and the CAMILE™ array is implemented. The temperature used for a given sample is that indicated in Table 3. In this array, a "ramp" is defined as a linear change of vacuum, temperature, or stir speed during the specified stage time. The stirring system is automatically calibrated between stages 4 and 5. After stage 6 ends, the vacuum level was ramped up to 140 torr, and then a 2 minute phosphorus addition stage (stage 8) begins. A phosphorus compound, an oligomeric phosphate triester, is only added to the Sb controls. The finisher stage (13) is terminated when the stirrer torque is such that it reaches the target (predetermined for a given temperature and polymer rig) three times. The finisher stage time is referred to as "Time to IV." Following the end of the array or lab preparation, the polymer is cooled for about 15 min., separated from the glass flask, cooled for about 10 min. and then placed immediately into liquid nitrogen. The polymer is ground cryogenically to pass a 3 mm screen.

The ground polymer is analyzed for acetaldehyde generation rate (AA Gen), inherent viscosity and VEG. The data can be seen in Table 3. The average AA Gen of production PET pellets, CB-12, tested at the same time was 25.5 ppm. (None of these are subject of the invention Examples; all are Comparative examples).

TABLE 3

| Ex. | Ti Target ppm | Temp deg C. | Vac. torr | Time to IV (min) | IhV dL/g | Vinyl End Groups (μeq/g) | AA Gen 295/5 ppm |
|---|---|---|---|---|---|---|---|
| Control[1] | | 285 | 1.1 | 103.32 | 0.805 | 0.9 | 29.35 |
| C1 | 10 | 285 | 1.1 | 45.38 | 0.796 | 0.2 | 37.565 |
| C2 | 15 | 270 | 2 | 158.97 | 0.803 | 0.1 | 41.255 |
| C3 | 10 | 285 | 1.1 | 57.12 | 0.838 | 0.1 | 38.93 |
| C4 | 15 | 300 | 0.2 | 9.47 | 0.791 | 0.6 | 40.805 |
| C5 | 5 | 270 | 0.2 | 123.64 | 0.795 | 1.2 | 28.34 |
| C6 | 5 | 300 | 2 | 54.77 | 0.831 | 5.4 | 38.52 |
| C7 | 10 | 285 | 1.1 | 56.5 | 0.829 | 0.2 | 39.93 |
| Control | | 285 | 1.1 | 91.46 | 0.771 | 0.7 | 34.405 |
| Control | | 285 | 1.1 | 93.04 | 0.789 | 0.9 | 30.97 |
| C8 | 5 | 270 | 2 | 223.17 | 0.781 | 0.7 | 23.96 |
| C9 | 5 | 300 | 0.2 | 30.08 | 0.805 | 4.2 | 38.465 |
| C10 | 15 | 270 | 0.2 | 51.43 | 0.766 | 0 | 40.72 |
| C11 | 15 | 300 | 2 | 16.22 | 0.771 | 0.4 | 46.15 |
| C12 | 10 | 285 | 1.1 | 49.39 | 0.834 | 0.4 | 28.13 |
| Control | | 285 | 1.1 | 106.01 | 0.807 | 0.8 | 32.415 |
| C13 | 10 | 285 | 1.1 | 43.4 | 0.792 | 0.3 | 38.005 |
| C14 | 10 | 285 | 1.1 | 51.92 | 0.852 | 0.8 | 28.21 |

[1]Controls had targets of 220 ppm Sb & 17 ppm P

In Table 3, all of the PET's with a Ti catalyst and no deactivator added late have AA generation rates of more than 22 ppm upon melting at 295° C. for 5 min in an extrusion plastometer. The two samples (C6 & C9) with the highest VEG have a low Ti level and a high polycondensation temperature. The high temperature (300° C.) results in more thermal degradation of the PET and hence, more VEG than can be converted to AA by the low level of Ti (5 ppm). When the Ti level is higher at the high temperature (C4 & C11), the VEG level goes down, and the AA generation goes up.

Example 2

To make the phosphorous acid salts of CyasorbUV 3529, two moles of phosphorous acid were used per mole of CyasorbUV 3529, and reacted per the following procedure. The salts can be manufactured according to the description in per copending U.S. application Ser. No. 10/392,575, which is fully incorporated herein by reference.

To a 5-L, round-bottomed flask equipped with a mechanical stirrer, thermocouple, and a heating mantle is added 411.76 g of Cyasorb UV-3529 and 945 g of toluene. Cyasorb UV-3529 is a polymeric hindered amine light stabilizer believed to conform generally to the compounds of amine formula (12) set forth previously, where $R_6=R_7=R_8=R_9=R_{10}$=methyl; $L_1$ is hexamethylene; and $(R_3)(R_4)N$— collectively represent a morpholino group (see also formula 21). The slurry is heated to 60° C. and stirred until a homogeneous solution was obtained. Isopropyl alcohol (370 g) is added to the reaction vessel. A solution of 115.46 g (1.41 mol) of phosphorous acid dissolved into 370 g of isopropyl alcohol is added in a small steady stream (fast dropwise) via an addition funnel to the Cyasorb UV-3529 solution with rapid stirring over approximately 30 minutes. A homogeneous solution is obtained and stirred for 15 min once the addition is complete.

The reaction mixture was pumped at about 5 mL/min into a 12 L reaction vessel that contained about 7 L of rapidly stirred heptane (4768 g) over a period of approximately 50 minutes. The feed rate of the reaction mixture into the heptane-containing vessel has some affect on the particle size of the final product. Slow feeds tend to produce a finer powder while higher feed rates will results in a larger particle that almost appears to be agglomerated. This needs to be balanced by the tendency for the salt to get sticky in the drowning vessel if the feed rate is too rapid. After addition was complete, the resulting slurry was stirred for about 60 minutes. The precipitate was collected by suction filtration. The filter cake was washed twice with 137 g of heptane and then sucked dry on the filter paper overnight. The solid was placed in a metal pan and dried overnight in a vacuum oven at 50° C. with a slight ingress of dry nitrogen. The dry product weighed approximately 531.8 g (101% of theory). Typical bulk density of the dry salt has been between 0.4 and 0.6 g/mL.

To test the phosphorous acid salts of Cyasorb UV3529, melt blending in a glass flask achieves a uniform distribution of additive within the polymer approximately simulating the mixing of an additive near the end of or after the final polycondensation reactor.

This example utilized 100 g of PET modified with about 2.6 mole % isophthalic acid and about 4.2 mole % diethylene glycol. This PET was produced on a production scale line with 10 ppm Ti and 0 ppm P. Pellets were ground to pass a 2 mm screen. Examples prefaced with the letter "C" are comparative examples.

The polyester powders are weighed into 500 mL round bottom flasks. The powders are dried at 120° C. under full vacuum overnight (about 16 hours) in a vacuum oven. After cooling the flask to about room temperature in a desiccator (about 1.5 hours), the additive is weighed into the flask. The additive was targeted at the 0.1 wt. % level. The blending parameters are set forth in the following table.

For mixing the amine salts with the polymers, a polymer head with stirrer is attached and the flask purged twice with nitrogen. The CAMILE™ automation system is programmed for the following array, as set forth in the following table.

| Stage | Time Min. | Temp. ° C. | Vacuum Torr | Stir RPM | Power kg-cm | Estimated End Time |
|---|---|---|---|---|---|---|
| 1 | .1 | 270 | 730 | 0 | 0 | 10:23:59 |
| 2 | 5 | 270 | 730 | 0 | 0 | 10:28:59 |
| 3 | 5 | 270 | 730 | 0 | 0 | 10:33:59 |
| 4 | 5 | 270 | 730 | 15* | 0 | 10:38:59 |
| 5 | 4 | 270 | 730 | 35* | 0 | 10:42:59 |

-continued

| Stage | Time Min. | Temp. °C. | Vacuum Torr | Stir RPM | Power kg-cm | Estimated End Time |
|---|---|---|---|---|---|---|
| 6 | 2 | 270 | 730 | 75* | 0 | 10:44:59 |
| 7 | 5 | 270 | 730 | 75 | 0 | 10:49:59 |

*= ramp

A moderate nitrogen purge was employed at all times. During Stages 2 and 3, the stirrer is turned slowly by hand. Following the end of the array, the polymer is cooled, chopped, and ground to pass a 3 mm screen. The ground polymer is analyzed for acetaldehyde generation rate, vinyl end group concentration, and inherent viscosity. The results are shown in Table 4, where the fifth column from the left is the amount of additive added in grams, where the additive is the phosphorous acid salts of Cyasorb UV 3529.

TABLE 4

| Example | Additive | Ti (ppm) | P (ppm) | Additive Added (g) | IV (dL/g) | AA GEN 295/5 (ppm) | % Reduction In AA GEN | VEG µeq/g |
|---|---|---|---|---|---|---|---|---|
| C15 | None | 10 | 0 | 0 | 0.797 | 36.285 | −1.7 | |
| C16 | None | 13 | 5 | 0 | 0.752 | 33.94 | 4.9 | 0.4 |
| C17 | None | 10 | 2 | 0 | 0.842 | 36.82 | −3.2 | 0.5 |
| 15 | Cyasorb UV 3529-H3PO3 | 12 | 54 | 0.106 | 0.734 | 9.325 | 73.9 | 1 |
| 16 | Cyasorb UV 3529-H3PO3 | 10 | 56 | 0.1 | 0.77 | 8.465 | 76.3 | 1 |

The % reduction in AA generation after melt processing in an extrusion plastometer at 295° C. for 5 minutes (AA GEN 295/5) was calculated as follows: 1) an average AA Gen for the runs with no additive was calculated to be 35.68 ppm, 2) the AA Gen for a given run was divided by 35.68 ppm, 3) the quotient was multiplied by 100, and 4) the product was subtracted from 100. As can be seen from the Table 5, % reduction in AA Gen 295/5 was around 75% for around 55 ppm P from phosphorous acid salts of Cyasorb UV 3529 ("Cyasorb UV 3529-H3PO3"). The average AA Gen of production CB-12 PET pellets tested at the same time was 23.5 ppm, much higher than the 8.5-9.3 ppm in the examples of this invention. The VEG level of PET after melt blending with the phosphorous acid salts of Cyasorb UV 3529 is about double that with no deactivator present. The additive has at least partially deactivated the catalyst so that the VEG build up and less AA is generated since fewer VEG are converted to AA, since this conversion is largely catalyzed. On average, the inherent viscosities dropped moderately (<0.05 dL/g) at the additive levels tested.

Samples 15 & 16 are titanium-catalyzed PET, with deactivator added late, which have AA generation rates of much less than 22 ppm upon melting at 295° C. for 5 min in an extrusion plastometer and vinyl end group levels above 0.8 µeq/g.

Example 3

This example uses the melting blending procedure, starting polymer, product work-up and the phosphorous acid salt of CYASORB UV 3529 described in Example 2. In addition, after cryogenically grinding the polyesters, residual AA samples are kept frozen until tested.

A series of polymers were prepared, employing various levels of the phosphorous acid salt of CYASORB UV 3529. The results are presented in Table 5, where the fifth column from the left is the inherent viscosity (IhV) in dL/g.

TABLE 5

| Sample | Cyasorb UV 3529-H3PO3 Amt g | Ti ppm | P ppm | IhV dl/g | Residual AA ppm. | % Reduced Residual AA | AAGEN 295/5 ppm | % Reduced AA Gen | VEG µeq/g |
|---|---|---|---|---|---|---|---|---|---|
| 17 | 0 | 10 | 1 | 0.744 | 17.21 | 0.00 | 35.32 | 0.00 | 0.3 |
| 18 | 0.02 | 10 | 16 | 0.716 | 4.45 | 74.14 | 10.07 | 71.49 | 0.8 |
| 19 | 0.04 | 10 | 29 | 0.723 | 8.07 | 53.11 | 9.27 | 73.75 | 1 |
| 20 | 0.06 | 10 | 39 | 0.72 | 6.11 | 64.50 | 10.28 | 70.89 | 1.1 |
| 21 | 0.08 | 10 | 46 | 0.714 | 4.14 | 75.94 | 7.4 | 79.05 | 0.8 |
| 22 | 0.1 | 10 | 61 | 0.687 | 4.32 | 74.90 | 7.61 | 78.45 | 0.9 |

Table 5 indicates that even at a very low concentration of the additive, 0.02 weight percent target for the additive, or 16 ppm P, the phosphorous acid salts of Cyasorb UV 3529 provides for a lowering (>70% reduction relative to no additive) of both residual acetaldehyde as well as acetaldehyde generated upon melting. Even at the very low concentration of the additive, the VEG concentration more than doubles relative to the case without additive.

Samples 18, 19, 20, 21 and 22 are titanium-catalyzed PET, with deactivator added late, which have AA Generation levels of much less than 22 ppm upon melting at 295° C. for 5 min in an extrusion plastometer and vinyl end group levels equal to or greater than 0.8 μeq/g.

Example 4

To make the phosphoric acid salts of CyasorbUV 3529, two moles of phosphoric acid are used per mole of CyasorbUV 3529, and reacted according to the following procedure.

To a 500-mL, round-bottomed flask equipped with a magnetic stir bar, thermocouple, and a heating mantle is added 41.18 g of Cyasorb UV-3529 and 94.51 g of toluene. Cyasorb UV-3529 is a polymeric hindered amine light stabilizer believed to conform generally to the compounds of amine formula (12) set forth previously, where $R_6=R_7=R_8=R_9=R_{10}=$methyl; L: is hexamethylene; and $(R_3)(R_4)N$— collectively represent a morpholino group (see also formula 21). The slurry is heated to 60° C. and stirred until a homogeneous solution was obtained. A solution of 16.23 g (0.141 mol) of phosphoric acid dissolved into 37.01 g of isopropyl alcohol is added in a small steady stream (moderate dropwise) via an addition funnel to the Cyasorb UV-3529 solution with rapid stirring over approximately 100 minutes. If the addition is too rapid, big chunks of solids form and make it difficult to stir. A slurry with light-colored solids is obtained and is stirred for 15 min once the addition is complete. The precipitate is a mixture of a fine white powder and sticky amber globules coated with white powder and is collected by suction filtration. The filter cake is washed with seven 40 mL portions of heptane and then sucked dry on the filter paper for 2 h. The solid is placed in a metal pan and dried over the weekend at 50° C. with a slight ingress of dry nitrogen. The dry product weighs approximately 36.48 g (66% of theory; fines in filtrate were not isolated).

A further series of polymers were prepared, employing the phosphoric acid salt of CYASORB UV 3529 ("Cyasorb UV 3529-H3PO4"). This example uses the melting blending procedure, the starting polymer and the product work-up described in Example 3. For Sample 23, the phosphorous acid salt of CYASORB UV 3529 is one described in Example 2. The results are shown in Table 6, in which the sixth column from the left contains inherent viscosity, IhV, in dL/g.

acid salts of Cyasorb UV 3529. The average AA Gen of production C-12 PET pellets tested at the same time was 22.6 ppm.

Samples 23 & 24 are titanium-catalyzed PET, with deactivator added late, which have AA Generation levels of much less than 22 ppm upon melting at 295° C. for 5 min in an extrusion plastometer and vinyl end group levels above 0.8 μeq/g. Sample 25 is titanium-catalyzed PET, with deactivator added late, which has AA Generation levels of much less than 22 ppm upon melting at 295° C. for 5 min in an extrusion plastometer and vinyl end group levels below 0.8 μeq/g. Since Sample 25 is a replicate of 24, a combination of variability in the sample preparation and in the VEG test may explain the low VEG number for Sample 25.

Example 5

Other additives were also employed: the phosphorous acid salt of N-methylpiperidine ("NMP-H3PO3"), the phosphorous acid salt of ammonia ("Ammonia-H3PO3"), and the phosphoric acid salt of N-methylpiperidine ("NMP-H3PO4").

To make the phosphorous acid salts of N-methylpiperidine, one mole of phosphorous acid is used per mole of N-methylpiperidine, and is reacted according to the following procedure.

To a 500-mL, round-bottomed flask equipped with a magnetic stir bar, thermocouple, and a heating mantle is added 7.0 g of 1-methyl-piperidine (0.0704 mol) and 94.5 g of toluene. The slurry is heated to 60° C. and stirred until a homogeneous solution was obtained. A solution of 5.8 g (0.0704 mol) of phosphorous acid dissolved into 37 g of isopropyl alcohol is added in a small steady stream (fast dropwise) via an addition funnel to the 1-methyl-piperidine solution with rapid stirring over approximately 55 minutes. The reaction mixture was pumped at about 5 mL/min over a period of approximately 40 minutes into a 2 L reaction vessel, fitted with a mechanical stirrer, that contained about 700 mL of rapidly stirred heptane (476.8 g). After addition was complete, the resulting solution was stirred for about 50 minutes. Suction filtration was initiated and then stopped when the product was determined to be a yellow oil containing some fine white solids. The solvent was rotavapped off using a vacuum pump and 55° C. water bath. The filter paper and flask were rinsed with heptane. The

TABLE 6

| Example | Additive | Additive Amount (g) | Ti (ppm) | P (ppm) | IhV (dl/g) | AA FN (ppm) | AAGEN 295/5 (ppm) | VEG μeq/g |
|---------|----------|---------------------|----------|---------|------------|-------------|-------------------|-----------|
| 23 | Cyasorb UV 3529-H3PO3 | 0.102 | 10 | 66 | 0.741 | 3.1 | 7.8 | 1 |
| 24 | Cyasorb UV 3529-H3PO4 | 0.105 | 10 | 83 | 0.725 | 3.6 | 7.19 | 0.9 |
| 25 | Cyasorb UV 3529 H3PO4 | 0.106 | 10 | 99 | 0.732 | 3.34 | 7.69 | 0.5 |

The runs with the phosphoric acid salt turned out to have a somewhat higher P level. Per Table 5, the level study with the phosphorous acid salts of Cyasorb UV 3529 did not indicate a large impact of level on AA performance. Table 6 indicates that the levels of residual AA in the powders and the AA generated upon melting were very similar for both the phosphoric acid salts of Cyasorb UV 3529 and the phosphorous solvent was removed on a rotary evaporator. The oil was dried over night and then for about 5 hours at about 50° C. with a slight ingress of dry nitrogen. The product weighed 7.5 g (12.75 g theory).

To make the phosphorous acid salts of ammonia, one mole of phosphorous acid are used per mole of ammonia, and reacted according to the following procedure.

To a 500-mL, round-bottomed flask equipped with a magnetic stir bar, thermocouple, and a heating mantle is added 8.5 g of 28-30% ammonium hydroxide and 94.5 g of toluene. The This example uses the melting blending procedure, the starting polymer, and the product work-up described in Example 3.

TABLE 7

| Ex. | Additive | Amount added to flask (g) | XRF Ti (ppm) | XRF P (ppm) | IhV (dL/g) | Residual AA (ppm) | % Residual AA Reduction | AA GEN 295/5 (ppm) | % AA Gen Reduction | VEG μeq/g |
|---|---|---|---|---|---|---|---|---|---|---|
| C18 | None | 0 | 9 | 3 | 0.804 | 21.25 | −9.8 | 30.54 | −2.2 | 0.3 |
| C19 | None | 0 | 10 | 5 | 0.79 | 17.45 | 9.8 | 29.25 | 2.2 | 0.6 |
| C20 | Cyasorb 3529 | 0.099 | 10 | 1 | 0.817 | 17.43 | 9.9 | 25.71 | 14 | 0.4 |
| 26 | Cyasorb UV 3529-H3PO3 | 0.101 | 10 | 57 | 0.747 | 4.57 | 76.4 | 11.96 | 60 | 0.8 |
| 27 | Cyasorb UV 3529-H3PO3 | 0.103 | 10 | 59 | 0.757 | 3.53 | 81.8 | 12.4 | 58.5 | 1 |
| 28 | NMP-H3PO3 | 0.048 | 10 | 66 | 0.768 | 7.18 | 62.9 | 20.73 | 30.7 | 1.1 |
| 29 | NMP-H3PO3 | 0.052 | 9 | 85 | 0.754 | 13.87 | 28.3 | 18.88 | 36.8 | 0.8 |
| 30 | NMP-H3PO4 | 0.053 | 10 | 78 | 0.746 | 13.94 | 28 | 20.35 | 31.9 | 1.2 |
| 31 | Ammonia-H3PO3 | 0.028 | 10 | 63 | 0.754 | 6.78 | 65 | 19.33 | 35.3 | 0.9 | slurry is heated to 60° C. and stirred until a homogeneous solution was obtained. A solution of 5.8 g (0.0704 mol) of phosphorous acid dissolved into 37.1 g of isopropyl alcohol is added in a small steady stream (fast dropwise) via an addition funnel to the ammonium hydroxide solution with rapid stirring over approximately 25 minutes. The solution is stirred for 15 min once the addition is complete. The reaction mixture was pumped at about 5 mL/min over a period of approximately 35 minutes into a 2 L reaction vessel, fitted with a mechanical stirrer that contained about 700 mL of rapidly stirred heptane (476.8 g). After addition was complete, the resulting solution was stirred for about 60 minutes. The solvent was rotavapped off using a vacuum pump and 55° C. water bath. White semisolids were visible after all the solvent was removed. The flask was rinsed with heptane, isopropyl alcohol and Millipore water. The solvents were removed on a rotary evaporator. The white solid is dried over night at 50° C. with a slight ingress of dry nitrogen. The product weighed 7.3 g.

To make the phosphoric acid salts of N-methylpiperidine, one mole of phosphoric acid are used per mole of N-methylpiperidine, and reacted according to the following procedure.

To a 500-mL, round-bottomed flask equipped with a magnetic stir bar, thermocouple, and a heating mantle is added 7.0 g of 1-methyl-piperidine and 94.5 g of toluene. The slurry is heated to 60° C. and stirred until a homogeneous solution was obtained. A solution of 8.1 g (0.0704 mol) of 85% phosphoric acid dissolved into 37 g of isopropyl alcohol is added in a small steady stream (fast dropwise) via an addition funnel to the 1-methyl-piperidine solution with rapid stirring over approximately 50 minutes. A yellow liquid with a white ring of solids is obtained and is stirred for 15 min once the addition is complete. After scraping sticky solids out of flask, the precipitate was collected by suction filtration. The filter cake is washed with eight approximately 40 mL portions of heptane and then sucked dry on the filter paper for 3 h. The solid is placed in a metal pan and dried over night and most of the next day at 50° C. with a slight ingress of dry nitrogen. The product weighed 12.1 g.

Samples 26, 27, 28, 29, 30 and 31 are titanium-catalyzed PET, with deactivator added late, which have an amount AA generated of less than 22 ppm, as measured when meltied at 295° C. for 5 min in an extrusion plastometer and vinyl end group levels greater than or equal to 0.8 μeq/g.

Of the salts shown in Table 7, the ones with the smaller, simpler organic bases had about half of the reduction in AA generation than that of the Cyasorb UV 3529-H3PO3 salt. The simpler salts are also much less expensive. Some applications and situations may require less reduction in AA generation than others, and the simpler salts would provide an economical solution in these cases. The average AA Gen of production CB-12 PET pellets tested at the same time was 22.0 ppm.

In addition, a run was also made to investigate the use of an amine additive itself, and not its salt. The results are presented as Example C20 in Table 7. Cyasorb UV 3529 did not reduce residual AA much; however, there was around a slight reduction in AA generation (10-15%). The AA Gen is greater than 22 ppm and the VEG level is less than 0.8 μeq/g. The amines alone are much less effective at lowering acetaldehyde than the amine salts made with a phosphorus-containing acid.

While the amine portion of the salt may scavenge some AA as shown in Example C20 in Table 8, the predominant mechanism for the salts to lower residual AA and AA Gen is thought to be catalyst deactivation, without being bound to a theory.

Example 6

Choosing an amino acid as the organic base offers the possibility that the carboxylic acid group of the amino acid may react into the PET chain.

To make the phosphoric acid salts of L-histidine, two moles of phosphoric acid are used per mole of L-histidine, and reacted according to the following procedure.

To a 500-mL, round-bottomed flask equipped with a magnetic stir bar, thermocouple, and a heating mantle is added 10.94 g of L-histidine and 143.97 g of Millipore water. The slurry is heated to 60° C. and stirred until a homogeneous solution was obtained. A solution of 16.397 g of phosphoric acid dissolved into 37 g of Millipore water is added in a small steady stream (fast dropwise) via an addition funnel to the L-histidine solution with rapid stirring over approximately 35 minutes. The solution is stirred for about 35 min once the addition is complete. The clear solution was transferred to a single-necked, 500 mL round-bottomed flask. The aqueous solvent was removed by freeze drying. The liquid was frozen while manually rotating in a dry ice/acetone bath. A lyo philizer was used for 3 days, 4 hours and 17 min. The white solid weighed 24.829 g (theory 24.722 g). By XRF, wt./wt. % P in the white solid was 17.17% (theory 17.6%).

To make the phosphoric acid salts of L-alanine, one mole of phosphoric acid are used per mole of L-alanine, and reacted according to the following procedure.

To a 500-mL, round-bottomed flask equipped with a magnetic stir bar, thermocouple, and a heating mantle is added 6.275 g of L-alanine and 94.5 g of Millipore water. The slurry is heated to 60° C. and stirred until a homogeneous solution was obtained. A solution of 8.201 g of phosphoric acid dissolved into 37.01 g of Millipore water is added in a small steady stream (fast dropwise) via an addition funnel to the L-alanine solution with rapid stirring over approximately 17 minutes. The solution is stirred for at least 15 min once the addition is complete. The clear solution was transferred to a single-necked, 500 mL round-bottomed flask. The aqueous solvent was removed by freeze drying. The liquid was frozen while manually rotating in a dry ice/acetone bath. A lyophilizer was used for 1 days, 19 hours and 15 min. The clear, viscous oil weighed 14.808 g (theory 13.17 g). By XRF, wt./wt. % P in the clear oil was 11.92% (theory 16.6%).

A further series of polymers were prepared, employing the phosphoric acid salt of L-histidine, phosphoric acid salt of L-alanine, both described above in this example, and the phosphoric acid salt of CYASORB UV 3529 ("Cyasorb UV 3529-H3PO4") described in Example 4. These examples use the melt-blending procedure, the starting polymer, and product work-up described in Example 3.

much less than 22 ppm upon melting at 295° C. for 5 min in an extrusion plastometer and vinyl end group levels greater than or equal to 0.8 µeq/g.

Table 8 indicates the two amino acid salts of phosphoric acid reduce residual M by 79-83% and AA generation upon melting by 65-66%. The CYASORB UV 3529 salt of phosphoric acid reduces residual AA by about 87%, AA generation upon melting by about 75%. While the % reduction in AA generation is about 10% less for the amino acid salts (about 64 ppm P). than for the Cyasorb UV 3529 salt (about 90 ppm P), the amino acids are less expensive, copolymerizable (less extractability expected), and water soluble (no VOC during salt preparation). The phosphoric acid salt of L-alanine is an oil, which may make it more economical to add than a solid salt like the phosphoric acid salt of L-histidine.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

Comparative Example 3

The oligomer, catalyst, procedure and polymerization array are described in Comparative Example 2, and the oligomeric phosphate triester, only added during prepolymer stages to the Sb controls in Comparative Example 2, is now added during prepolymer stages to a Ti-catalyzed run. After stage 6 ends, the vacuum level was ramped up to 140 torr, and then a 2 minute phosphorus addition stage (stage 8) begins.

TABLE 8

| Ex. | Additive | Amount added to flask (g) | XRF Ti (ppm) | XRF P (ppm) | IhV (dL/g) | Residual AA (ppm) | % Residual AA Reduction | AA GEN 295/5 (ppm) | % AA Gen Reduction | VEG µeq/g |
|---|---|---|---|---|---|---|---|---|---|---|
| C21 | None | 0 | 9 | 2 | 0.781 | 11.5 | 0 | 28.7 | 0 | 0.3 |
| 32 | Cyasorb UV 3529-H3PO4 | 0.108 | 9 | 90 | 0.745 | 1.5 | 86.8 | 7.2 | 74.8 | 0.9 |
| 33 | Histidine-H3PO4 | 0.047* | 10 | 63 | 0.756 | 1.9 | 83.2 | 10.0 | 65.1 | 0.8 |
| 34 | Alanine-H3PO4 | 0.057* | 10 | 64 | 0.736 | 2.5 | 78.7 | 9.7 | 66.1 | 1.1 |

*= targets

Samples 32, 33 and 34 are titanium-catalyzed PET, with deactivator added late, which have AA Generation levels of The residual or free AA samples are handled as described in Example 3.

TABLE 9

| Sample | Temp (deg C.) | Vacuum (torr) | Target P/Ti MR | XRF P (ppm) | Time to IV (min) | IV dL/g | Vinyl End Groups µeq/g | Residual AA (ppm) | AA Gen 295/5 (ppm) |
|---|---|---|---|---|---|---|---|---|---|
| C22 | 270 | 0.2 | 0 | 1.9 | 59.55 | 0.749 | 0.20 | 9.98 | 28.06 |
| C23 | 270 | 0.2 | 1.6 | 9 | 302.82 | 0.769 | 4.10 | 7.76 | 13.32 |

When deactivator is added early, that is before the finisher stage, the finisher time increases greatly relative to the finisher time with no deactivator being added. Although Sample C23 is titanium-catalyzed PET, which has AA Generation levels of less than 22 ppm upon melting at 295° C. for 5 min in an extrusion plastometer, and vinyl end group levels greater than or equal to 0.8 μeq/g, the very long finisher stage time is a negative.

What is claimed is:

1. A process for manufacturing a polyester polymer, comprising:
   a) polycondensing a first polyester polymer in the presence of one or more polycondensation catalysts;
   b) adding at least one additive compound comprising a catalyst deactivator compound to said first polyester polymer after said first polyester polymer has reached an It.V. of at least 0.68 dl/g,
   thereby producing the polyester polymer with a vinyl ends concentration of from 0.8 to 2.9 μeg/gram and an AA generation rate at 295° C. for 5 minutes of less than 17.5 ppm,
   wherein the polyester polymer with a vinyl ends concentration of from 0.8 to 2.9 μeg/gram is lacking an organic acetaldehyde scavenger.

2. The process of claim 1, wherein the adding b) of said catalyst deactivator compound is after said polyester polymer has reached an It.V. of at least 0.72 dl/g.

3. The process of claim 1, further comprising:
   c) further processing the polyester polymer to obtain a molded product.

4. The process of claim 1, wherein said polyester polymer is a melt and is solidified to form a polyester polymer particle.

5. The process of claim 1, wherein said polyester polymer is cut with a cutter and solidified to form at least one polyester polymer particle.

6. The process of claim 5, wherein a molded product is obtained from said polyester polymer particle.

7. The process of any one of claims 3, 5, and 6, wherein said molded product is a bottle preform.

8. The process of claim 1, wherein said polyester polymer comprises a polyethylene terephthalate polyester.

9. The process of claim 8, wherein said polyethylene terephthalate polyester contains not more than 10 mole percent of diol residues that are not residues of ethylene glycol, and no more than 10 mole percent of diacid residues that are not residues of terephthalic acid, wherein the mole percentage of diol residues are based on 100 mole percent of total diol residues in the polyester and where the molar percentage of diacid residues are based on 100 mole percent of total diacid residues in the polyester.

10. The process of claim 1, wherein said polycondensation catalyst comprises at least one catalytically active metal compound wherein said metal is selected from the group consisting of titanium, antimony, aluminum, alkali metals, and alkaline earth metals.

11. The process of claim 10, wherein said polycondensation catalyst comprises a titanium alkoxide and wherein said titanium alkoxide is present in such an amount that there is 3 ppm to 35 ppm titanium, based on the weight of the polyester polymer.

12. The process of claim 11, wherein said polycondensation catalyst comprises an antimony triacetate or antimony trioxide, and wherein said antimony triacetate or antimony trioxide is present in such an amount that there is 20 ppm to 300 ppm antimony, based on the weight of the polyester polymer.

13. The process of claim 10, wherein said polycondensation catalyst comprises at least one aluminum compound represented by the formula:

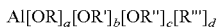

wherein R, R', R" are independently an alkyl group, aryl group, acyl group or hydrogen, R''' is an anionic group, and a, b, c, d are independently 0 or positive integers, and a+b+c+d is no greater than 3.

14. The process of claim 10, wherein said polycondensation catalyst comprises at least one aluminum compound comprising carboxylic acid salts of aluminum, substituted aluminum hydroxides, aluminum alcoholates, or aluminum chelates in which the alkoxy group of an aluminum alcoholate is partially or wholly substituted by a chelating agent.

15. The process of claim 10, wherein said polycondensation catalyst comprises at least one aluminum compound comprising aluminum carboxylates, basic aluminum carboxylates, aluminum alkoxides, or a combination thereof.

16. The process of any one of claims 13, 14, and 15, wherein said aluminum compound is present in an amount ranging from 2 ppm to 150 ppm based on aluminum weight relative to the weight of the polyester polymer.

17. The process of claim 1, wherein said catalyst deactivator comprises phosphorus atoms in the amount of 3 ppm to 250 ppm based on phosphorus weight relative to the weight of the polyester polymer.

18. The process of claim 17, wherein said phosphorous atoms are obtained from phosphoric acid, phosphorous acid, polyphosphoric acid, pyrophosphoric acid, carboxyphosphonic acids, phosphonic acid derivatives, or any of their salts and esters and derivatives.

19. The process of claim 18, wherein said phosphorous atoms comprise acidic phosphorus compounds.

20. The process of claim 10, wherein said polycondensation catalyst comprises
   at least one alkaline earth metal or alkali metal, and
   at least one aluminum compound,
   wherein the alkaline earth metal or alkali metal is present in an amount such that a mole ratio of alkaline earth metal or alkali metal to aluminum ranges from 0.1 to about 75.

21. The process of claim 20, wherein said polycondensation catalyst comprises
   at least one alkaline earth metal or alkali metal, and
   at least one aluminum compound,
   wherein the alkaline earth metal or alkali metal is present in an amount such that a mole ratio of alkaline earth metal or alkali metal to aluminum ranges from 0.5 to about 10.

22. The process of claim 1, wherein said polycondensation catalyst comprises
   aluminum, and
   at least one alkali metal or alkaline earth metal, and
   wherein said catalyst deactivator comprises phosphorus atoms and is present in such an amount that a molar ratio of phosphorus to a cumulative total moles of aluminum, alkaline earth metals, and alkali metals ranges from about 0.1 to about 3.

23. The process of claim 22, wherein the molar ratio of phosphorus to the cumulative total moles of aluminum, alkaline earth metals and alkali metals ranges from about 0.5 to about 1.5.

24. The process of claim 1, wherein said polycondensation catalyst comprises titanium, and
   said catalyst deactivator comprises phosphorus atoms and is present in such an amount that a molar ratio of phosphorus to titanium atoms is at least 0.015 to 1.

25. The process of claim 24, wherein the molar ratio of phosphorus to titanium atoms is at least 0.7 to 1.

26. The process of any one of claims 22 and 24, wherein said phosphorous atoms are obtained from phosphoric acid, phosphorous acid, polyphosphoric acid, pyrophosphoric acid, carboxyphosphonic acids, phosphonic acid derivatives, or any of their salts, esters, or derivatives.

27. The process of claim 1, wherein the polyester polymer with a vinyl ends concentration of from 0.8 to 2.9 μeq/gram has an AA generation rate at 295° C. for five minutes of less than 12.7 ppm.

28. The process of claim 1, wherein the polyester polymer produced in (b) has a vinyl ends concentration of from 1.1 to 2.9 μeq/g.

29. The process of claim 1, wherein the polyester polymer produced in (b) has a vinyl ends group concentration of from 1.4 to 2.9 μeq/g.

30. The process of claim 1, wherein the polyester polymer produced by (b) has an AA generation rate at 295° C. for five minutes of from 9.5 to 17.5 ppm and a vinyl ends concentration of from 1.1 to 2.9 μeq/g.

\* \* \* \* \*